US011892354B2

(12) United States Patent
Ideguchi et al.

(10) Patent No.: US 11,892,354 B2
(45) Date of Patent: Feb. 6, 2024

(54) HIGH-SPEED FOURIER-TRANSFORM SPECTROSCOPY APPARATUS AND SPECTROSCOPY METHOD

(71) Applicant: THE UNIVERSITY OF TOKYO, Tokyo (JP)

(72) Inventors: Takuro Ideguchi, Tokyo (JP); Kazuki Hashimoto, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 606 days.

(21) Appl. No.: 17/140,319

(22) Filed: Jan. 4, 2021

(65) Prior Publication Data
US 2021/0223105 A1    Jul. 22, 2021

Related U.S. Application Data

(63) Continuation of application No. PCT/JP2019/026469, filed on Jul. 3, 2019.

(30) Foreign Application Priority Data

Jul. 6, 2018 (JP) .................................. 2018-129410

(51) Int. Cl.
G01J 3/453    (2006.01)
G01J 3/02     (2006.01)
G01J 3/18     (2006.01)

(52) U.S. Cl.
CPC ............. *G01J 3/4535* (2013.01); *G01J 3/021* (2013.01); *G01J 3/0224* (2013.01);
(Continued)

(58) Field of Classification Search
None
See application file for complete search history.

(56) References Cited

U.S. PATENT DOCUMENTS 6,111,645 A * 8/2000 Tearney ............... A61B 5/6852
                                               356/484
6,282,011 B1 * 8/2001 Tearney ................. G11B 7/127
                                               356/485
(Continued)

FOREIGN PATENT DOCUMENTS

JP    H0712648 A     1/1995
JP    2000213918 A   8/2000
(Continued)

OTHER PUBLICATIONS

Hashimoto, et al "Phase-controlled Fourier-transform spectroscopy" arXiv 1807-03630, submitted Jul. 6, 2018 (Year: 2018).*
(Continued)

*Primary Examiner* — Thomas R Artman
(74) *Attorney, Agent, or Firm* — CANTOR COLBURN LLP

(57) ABSTRACT

In a Fourier-transform spectroscopy apparatus, a scanning mirror is arranged on a light path of scanning light. The scanning mirror delays or advances the scanning light with respect to reference light according to the rotational angle of the scanning mirror from its initial position. A spectroscopic spectrum generating unit generates an interferogram based on the intensity of the detection target light obtained from the detection target, and Fourier transforms the interferogram thus generated. The spectroscopic spectrum generating unit corrects the nonlinearity of the group delay between an envelope of the reference light and an envelope of the scanning light, and corrects the nonlinearity of the phase shift between the respective envelopes.

9 Claims, 14 Drawing Sheets

(52) U.S. Cl.
CPC ............... G01J 3/0297 (2013.01); G01J 3/18 (2013.01); *G01J 2003/4534* (2013.01)

(56) References Cited

U.S. PATENT DOCUMENTS

| | | | | |
|---|---|---|---|---|
| 6,421,164 | B2* | 7/2002 | Tearney | A61B 5/0064 250/227.27 |
| 7,061,622 | B2* | 6/2006 | Rollins | G01B 11/2441 356/497 |
| 7,889,348 | B2* | 2/2011 | Tearney | A61B 1/07 356/451 |
| 8,175,685 | B2* | 5/2012 | Yun | G01N 21/4795 600/479 |
| 10,379,042 | B2* | 8/2019 | Ideguchi | G02B 26/0816 |
| 10,753,801 | B2* | 8/2020 | Bourbeau Hébert | G01J 3/45 |
| 2001/0036002 | A1* | 11/2001 | Tearney | A61B 5/0064 359/278 |
| 2003/0137669 | A1* | 7/2003 | Rollins | G01B 11/2441 356/479 |
| 2007/0087445 | A1* | 4/2007 | Tearney | G01N 21/6408 436/172 |
| 2007/0276269 | A1* | 11/2007 | Yun | A61B 3/0025 600/504 |
| 2018/0321143 | A1* | 11/2018 | Ideguchi | G02B 26/10 |
| 2019/0391016 | A1* | 12/2019 | Bourbeau Hébert | G01B 9/02008 |
| 2021/0223105 | A1* | 7/2021 | Ideguchi | G01J 3/0224 |

FOREIGN PATENT DOCUMENTS

| | | | |
|---|---|---|---|
| JP | 2001527659 | A | 12/2001 |
| JP | 2006215006 | A | 8/2006 |
| JP | 2006300792 | A * | 11/2006 |
| JP | 2014106127 | A | 6/2014 |
| WO | 9852021 | A1 | 11/1998 |
| WO | 2017119389 | A | 7/2017 |

OTHER PUBLICATIONS

Hashimoto, et al "Phase-controlled Fourier-transform spectroscopy" Nature Communications (2018) 9:4448 DOI: 10:1038/s41467-018-06956-x (Year: 2018).*
Hashimoto, et al "Broadband coherent Raman spectroscopy running at 24,000 spectra per second" (Feb. 15, 2016) Scientific Reports 6:21036. DOI: 10/1038/srep21036. (Year: 2016).*
PCT International Preliminary Report on Patentability with Written Opinion of the International Searching Authority for International Application No. PCT/JP2019/026469; dated Jan. 12, 2021.
International Search Report for International Application No. PCT/JP2019/026469; dated Aug. 6, 2019.
Ogilvie, J., et al., "Fourier-transform coherent anti-Stokes Raman scattering microscopy", Optics Letters, vol. 31, No. 4, Feb. 15, 2006; pp. 480-482.
JPO Notification of Reason(s) for Refusal for corresponding JP Application No. 2020-529032; dated Mar. 22, 2023.

* cited by examiner

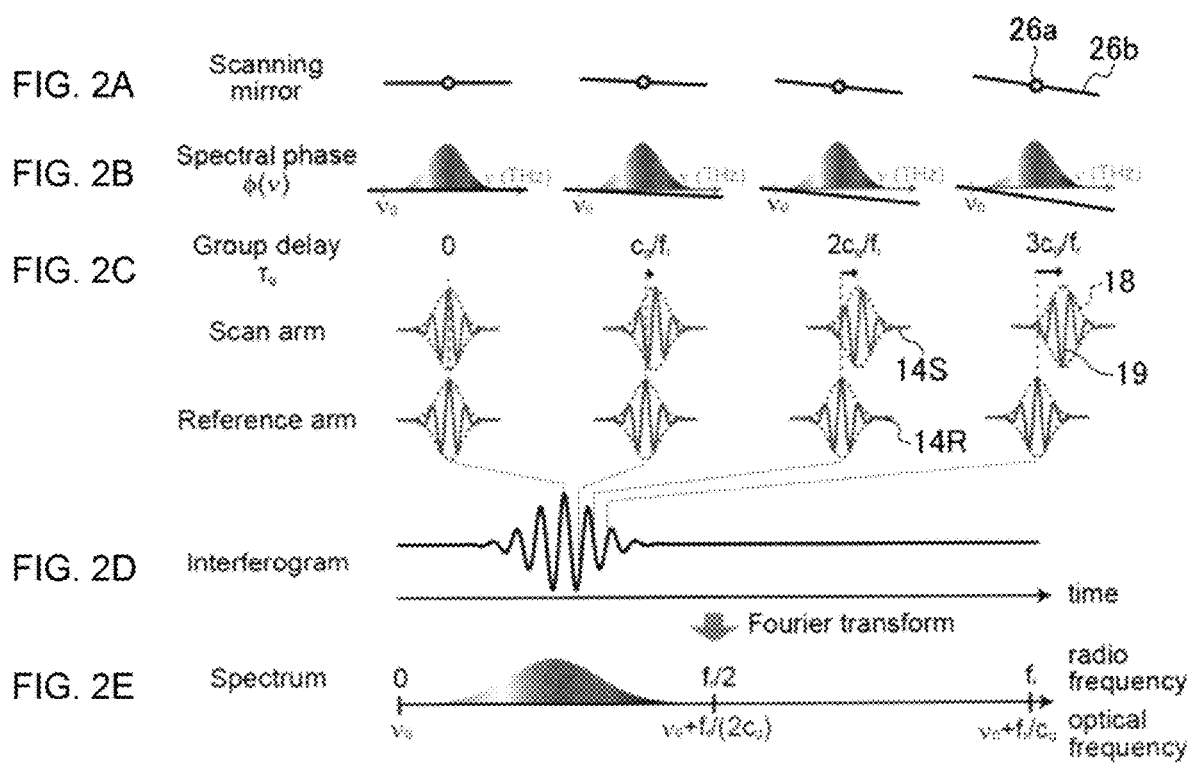

HIGH-SPEED FOURIER-TRANSFORM SPECTROSCOPY APPARATUS AND SPECTROSCOPY METHOD

CROSS REFERENCE TO PRIOR APPLICATIONS

This application is a continuation under 35 U.S.C. § 120 of PCT/JP2019/026469, filed Jul. 3, 2019, which is incorporated herein reference and which claimed priority to Japanese Application No. 2018-129410, filed Jul. 6, 2018. The present application likewise claims priority under 35 U.S.C. § 119 to Japanese Application No. 2018-129410, filed Jul. 6, 2018, the entire content of which is also incorporated herein by reference.

BACKGROUND

1. Technical Field

The present disclosure related to a Fourier-transform spectroscopy apparatus and spectroscopy method.

2. Description of the Related Art

As a method for measuring a spectrum of a specimen, a Fourier-transform spectroscopy method such as the Fourier-transform infrared spectroscopy method (which is also referred to as "FT-IR") (see Patent document 1, for example), the Fourier-transform coherent anti-Stokes Raman scattering (which is also referred to as "FT-CARS") spectroscopy method (see Non-patent document 1, for example), etc. are known.

With a Fourier-transform spectroscopy method, an interference wave is generated using a Michelson interferometer configured to split light emitted from a light source by means of a beam splitter into reference light that propagates through a first arm having a fixed mirror and scanning light that propagates through a second arm having a movable mirror, and to combine the reference light reflected by the fixed mirror of the first arm and the scanning light reflected by the movable mirror of the second arm. The interference wave thus generated is irradiated to the specimen. With such a Fourier-transform spectroscopy method, the Michelson interferometer is operated such that the movable mirror is moved in one direction so as to change the light path length of the second arm so as to delay the scanning light with respect to the reference light. With this, an interferogram of the interference wave is generated. The interferogram is subjected to a Fourier transform so as to obtain a molecular vibration spectrum.

With the FT-IR method, which is one method of Fourier-transform spectroscopy, an interference wave passes through the specimen, thereby generating an interferogram of transmitted light. The interferogram thus generated is subjected to a Fourier transform so as to obtain a molecular vibration spectrum of the specimen. On the other hand, with the FT-CARS spectroscopy method, this arrangement generates an interferogram of anti-Stokes light emitted due to coherent anti-Stokes Raman scattering that occurs in a specimen due to irradiation of interference wave. The interferogram thus generated is subjected to a Fourier transform so as to obtain a molecular vibration spectrum of the specimen.

As described above, with such a Fourier-transform spectroscopy method, the scanning light is delayed with respect to the reference light using a Michelson interferometer so as to generate an interferogram. The interferogram thus generated is subjected to a Fourier transform so as to generate a molecular vibration spectrum. With such a Fourier-transform spectroscopy method, a broadband light spectrum is acquired, thereby acquiring the absorption of the specimen.

With a Fourier-transform spectroscopy method, in the measurement operation, the position of the movable mirror is moved so as to change the light path length difference between the first arm and the second arm, in order to generate an interferogram. Accordingly, the speed at which the movable mirror is moved is a bottleneck with regard to the speed at which the interferogram is generated. That is to say, it is difficult to improve the speed of acquisition of the molecular vibration spectrum, which is a problem.

In order to solve this problem, Patent document 2 has proposed a technique in which a scanning mirror is arranged on a light path of the scanning light propagation between the beam splitter and the second mirror in the second arm. The scanning light is delayed or advanced with respect to the reference light according to the rotational angle of the scanning mirror from an initial position thereof. It is known that this technique has been applied to a Fourier-transform coherent anti-Stokes Raman scattering spectroscopy apparatus. That is to say, an interferogram of anti-Stokes light emitted as the detection target light due to coherent anti-Stokes Raman scattering that occurs in a specimen due to the irradiation of interference light generated by an interferometer is subjected to a Fourier transform using a PC, so as to generate a broadband molecular vibration spectrum. By combining a 4f optical system and a mechanism configured to rotate a scanning mirror so as to change the rotational angle thereof, the spectroscopy apparatus is capable of converting the change in the rotational angle into a light delay amount. As a result, by rotating the scanning mirror, the light path length of the scanning light can be changed. This allows the scanning light to be delayed or advanced with respect to the reference light according to the rotational angle of the scanning mirror from the initial position. Accordingly, this arrangement allows the scanning mirror to be moved with a higher speed as compared with an arrangement such as a conventional Fourier-transform spectroscopy apparatus configured to move the position of the movable mirror so as to delay the scanning light with respect to the reference light. Thus, it is known that this arrangement provides a further improved molecular vibration spectrum acquisition speed.

RELATED ART DOCUMENTS

Patent Documents

[Patent document 1]
Japanese Patent Application Laid Open No. H07-12648

Non-Patent Documents

[Non-patent document 1]
Jennifer P. Ogilvie et al., OPTICS LETTERS/Vol. 31, No. 4, 480 (2006).

Coherent Raman spectroscopy requires the group delay (delay of an envelope of the scanning light with respect to an envelope of the reference light) to have linearity with respect to the rotational angle (or time). In contrast, absorption spectroscopy requires both the group delay and the phase shift (phase deviation of a carrier wave in each envelope) to each have linearity with respect to the rotational angle. However, with coherent Raman spectroscopy according to the prior art described above, in a case in which the group delay changes in a non-linear manner, a parameter having one degree of freedom for handling the nonlinearity of the group delay may preferably be corrected with respect to a single wavelength. However, absorption spectroscopy has nonlinearity with respect to two factors, i.e., the group delay and the phase shift. Accordingly, the correction method (single-wavelength correction) employed in coherent Raman spectroscopy cannot be directly applied to absorption spectroscopy.

SUMMARY

In view of such a situation, an embodiment of the present disclosure has been made.

(1) A high-speed scanning Fourier-transform spectroscopy apparatus according to an embodiment of the present disclosure includes: an interferometer including a beam splitter structured to split light emitted from a light source into reference light and scanning light, a first arm structured to reflect the reference light by a first mirror such that it is re-input to the beam splitter, and a second arm structured to reflect the scanning light by a second mirror such that it is re-input to the beam splitter, in which the interferometer is structured to combine the reference light and the scanning light re-input to the beam splitter so as to generate an interference wave; and a spectroscopic spectrum generating unit structured to generate an interferogram based on the intensity of detection light obtained from a detection target after either light emitted from the light source or the interference wave thus combined is irradiated to the detection target, and to apply a Fourier transform to the interferogram. The second arm is configured such that a scanning mirror is arranged on a light path of the scanning light between the beam splitter and the second mirror so as to delay or advance the scanning light with respect to the reference light according to the rotational angle of the scanning mirror from its initial position. The spectroscopic spectrum generating unit corrects the nonlinearity of a group delay which is a delay defined between an envelope of the reference light and an envelope of the scanning light, and corrects the nonlinearity of a phase shift which is a phase deviation with respect to a carrier wave in each carrier wave.

(2) A Fourier-transform spectroscopy apparatus according to another embodiment of the present disclosure includes: an interferometer including a beam splitter structured to split light emitted from a light source into reference light and scanning light, a first arm structured to reflect the reference light by a first mirror such that it is re-input to the beam splitter, and a second arm structured to reflect the scanning light by a second mirror such that it is re-input to the beam splitter, in which the interferometer is structured to combine the reference light and the scanning light re-input to the beam splitter so as to generate an interference wave; and a spectroscopic spectrum generating unit structured to generate an interferogram based on the intensity of detection light obtained from a detection target after either light emitted from the light source or the interference wave thus combined is irradiated to the detection target, and to apply a Fourier transform to the interferogram. The second arm is configured such that a scanning mirror is arranged on a light path of the scanning light between the beam splitter and the second mirror so as to delay or advance the scanning light with respect to the reference light according to the rotational angle of the scanning mirror from its initial position. The spectroscopic spectrum generating unit corrects a group delay which is a delay between an envelope of the reference light and an envelope of the scanning light and a phase shift which is a phase deviation with respect to a carrier wave in each envelope, such that the group and the phase are aligned at regular intervals.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2A through 2E are explanatory diagrams for explaining two degrees of freedom to be corrected in the embodiment, and specifically, FIG. 2A shows an arrangement in which a scanning mirror is operated such that it is moved in a linear or nonlinear manner, FIG. 2B shows a phase state that corresponds to FIG. 2A, FIG. 2C shows an example of scanning light and reference light with a group delay and phase shift, FIG. 2D shows an interference waveform obtained by detecting the electric field shown in FIG. 2C by means of a detector, and FIG. 2E shows a spectrum waveform of the interference waveform shown in FIG. 2D;

FIG. 3A shows an example of a continuous interferogram of $H^{12}C^{14}N$ measured by a mode-locked laser, and FIG. 3B shows a broadband spectrum obtained by subjecting a single interferogram to a Fourier transform;

FIG. 8A is a schematic diagram showing a delay line using a galvanometric scanner, and FIG. 8B is a schematic diagram showing a delay line using a polygon scanner;

FIG. 12A shows a continuous interferogram of $H^{12}C^{14}N$ molecules measured using an SLD light source at a scanning speed of 24 kHz, and FIG. 12B shows a spectrum obtained by subjecting a single interferogram to a Fourier transform (left-side graph), and FIG. 12B shows a 30-averaged spectrum (right-side graph);

FIG. 13A shows an arrangement including a light source that supports another frequency, and FIG. 13B shows an arrangement employing a bandpass filter;

DETAILED DESCRIPTION

Outline

Figure 1:
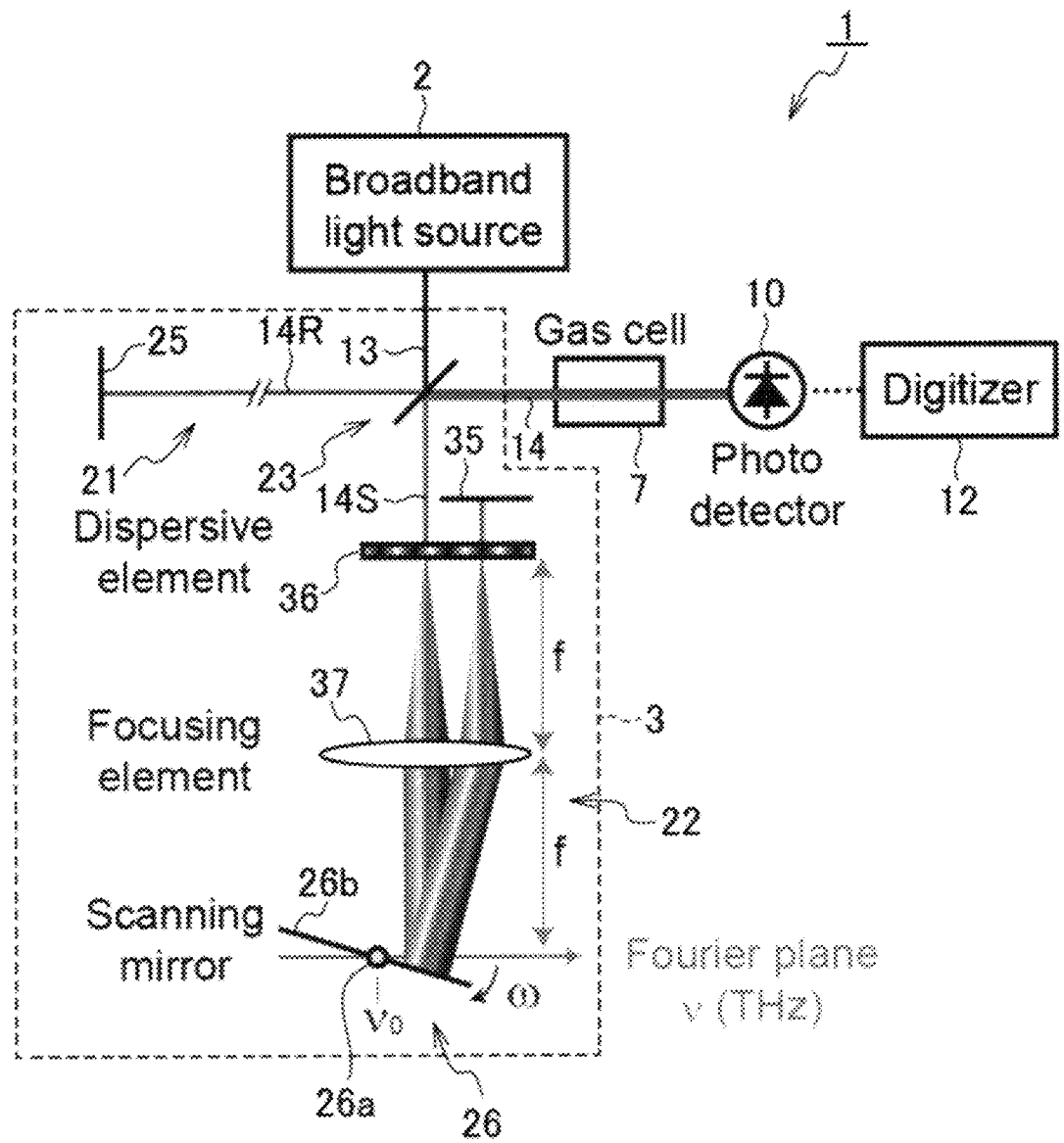
FIG. 1 is a schematic diagram showing an example of a Fourier-transform spectroscopy apparatus according to an embodiment.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

In the course of researching a high-speed spectrum measurement method for electron transition that occurs in atoms or molecules, molecular vibration, molecular rotation, crystal lattice vibration, etc., in Fourier-transform spectroscopy, the present inventor has focused on correction of two degrees of freedom that cause distortion in data after the acquired data is subjected to a Fourier transform. It has been found that, by correcting the two degrees of freedom, such an arrangement provides a further improved spectrum acquisition speed even in a case in which the scanning mirror is moved at a higher speed in a linear or nonlinear manner. As a specific example, in a case in which a light pulse generated as an interference wave (waveform detected by a detector) shown in FIG. 2D is applied, scanning light 14S shown in FIG. 2B and reference light 14R shown in FIG. 2C are generated. Furthermore, in a case in which the scanning mirror 26b shown in FIG. 2A is operated such that it is moved in a linear manner or a nonlinear manner, a delay (which will be referred to as a "group delay" hereafter) occurs in an envelope 18 (which will also be referred to as an "envelope curve" hereafter) of the scanning light 14S with respect to an envelope 18 of the reference light 14R. In addition, a phase deviation (which will be referred to as a "phase shift" hereafter) occurs in a carrier wave 19 included in the envelope 18. In a case in which the group delay and the phase shift have nonlinearity, and in a case in which the acquired data is directly subjected to a Fourier transform without correction, this leads to the occurrence of distortion in the spectrum. With the present disclosure, correction is performed for two degrees of freedom that cause such a phenomenon. That is to say, correction is performed for: nonlinearity of the group delay that occurs in the envelope 18 of the scanning light 14S with respect to the reference light 14R; and nonlinearity of the phase shift that occurs in the carrier wave 19 included in the envelope 18 with respect to the reference light 14R.

(1) A high-speed scanning Fourier-transform spectroscopy apparatus according to an embodiment of the present disclosure includes: an interferometer including a beam splitter structured to split light emitted from a light source into reference light and scanning light, a first arm structured to reflect the reference light by a first mirror such that it is re-input to the beam splitter, and a second arm structured to reflect the scanning light by a second mirror such that it is re-input to the beam splitter, in which the interferometer is structured to combine the reference light and the scanning light re-input to the beam splitter so as to generate an interference wave; and a spectroscopic spectrum generating unit structured to generate an interferogram based on the intensity of detection light obtained from a detection target after either light emitted from the light source or the interference wave thus combined is irradiated to the detection target, and to apply a Fourier transform to the interferogram. The second arm is configured such that a scanning mirror is arranged on a light path of the scanning light between the beam splitter and the second mirror so as to delay or advance the scanning light with respect to the reference light according to the rotational angle of the scanning mirror from its initial position. The spectroscopic spectrum generating unit corrects the nonlinearity of a group delay which is a delay defined between an envelope of the reference light and an envelope of the scanning light, and corrects the nonlinearity of a phase shift which is a phase deviation with respect to a carrier wave in each carrier wave.

With this configuration, in the second arm, the scanning mirror is rotated so as to change the light path length of the scanning light. This allows the scanning light to be delayed or advanced with respect to the reference light according to the rotational angle of the scanning mirror from its initial angle. Accordingly, such an arrangement allows the scanning mirror to be moved at a higher speed, thereby further improving the spectrum acquisition speed in the absorption spectroscopy. With such an arrangement, the nonlinearity of the group delay, which is a delay between the envelope of the reference light and the envelope of the scanning light, and the nonlinearity of the phase shift, which is phase deviation between the carrier waves included in the respective envelopes, that occur due to the movement of the scanning mirror are corrected such that the group and the phase are aligned at regular intervals, thereby providing a high-speed scanning Fourier-transform spectroscopy method in absorption spectroscopy.

With an embodiment, the group delay and the phase shift may be acquired for each of two different frequencies. Also, the two different frequencies may be obtained from a single light source or may be obtained from two light sources.

With an embodiment, the group delay and the phase shift may each be corrected using one from among: (i) a correction method based on experimental measurement of the group delay and the phase shift that occur in the scanning light with respect to the reference light; (ii) a correction method assuming a phase shift curve and a group delay curve based on a theoretical expression; and (iii) a correction method based on machine learning optimization executed such that the phase shift curve and the group delay curve match a spectrum shape.

With an embodiment, the second arm may include a dispersive optical element arranged on a light path of the scanning light defined between the beam splitter and the scanning mirror, and structured to diffract the scanning light. Also, the second arm may apply a light path length difference to light of each wavelength component of the scanning light according to the rotational angle of the scanning mirror from its initial position, such that the phase state of the light is changed for each wavelength component of the scanning light, so as to delay or advance the scanning light with respect to the reference light.

With an embodiment, the scanning mirror may include an optical scanning element structured to change the angle of incident light. Examples of such an optical scanning mirror include a movable scanner such as a polygon scanner, a resonant scanner, a galvanometric scanner, etc., a MEMS scanner, an electro-optical crystal scanner, and an acousto-optical scanner.

With an embodiment, the detection target light emitted from the detection target may be configured as transmission light, reflected light, or scattered light.

(2) A Fourier-transform spectroscopy apparatus according to another embodiment of the present disclosure includes: an interferometer including a beam splitter structured to split light emitted from a light source into reference light and scanning light, a first arm structured to reflect the reference light by a first mirror such that it is re-input to the beam splitter, and a second arm structured to reflect the scanning light by a second mirror such that it is re-input to the beam splitter, in which the interferometer is structured to combine the reference light and the scanning light re-input to the beam splitter so as to generate an interference wave; and a spectroscopic spectrum generating unit structured to generate an interferogram based on the intensity of detection light obtained from a detection target after either light emitted from the light source or the interference wave thus combined is irradiated to the detection target, and to apply a Fourier transform to the interferogram. The second arm is configured such that a scanning mirror is arranged on a light path of the scanning light between the beam splitter and the second mirror so as to delay or advance the scanning light with respect to the reference light according to the rotational angle of the scanning mirror. The spectroscopic spectrum generating unit corrects a group delay which is a delay defined between an envelope of the reference light and an envelope of the scanning light and a phase shift which is a phase deviation with respect to a carrier wave in each envelope, such that the group and the phase are aligned at regular intervals.

EMBODIMENT

Description will be made with reference to the drawings regarding an embodiment of a Fourier-transform spectroscopy apparatus according to the present disclosure. The present invention is not restricted to the following embodiment. That is to say, the present invention encompasses various kinds of modifications and applications so long as they incorporate the sprit and technical scope of the present invention. It should be noted that, in the present specification, in some cases, Fourier-transform spectroscopy will be abbreviated as "FTS".

Overall Configuration of Fourier-Transform Spectroscopy Apparatus

Figure 7:
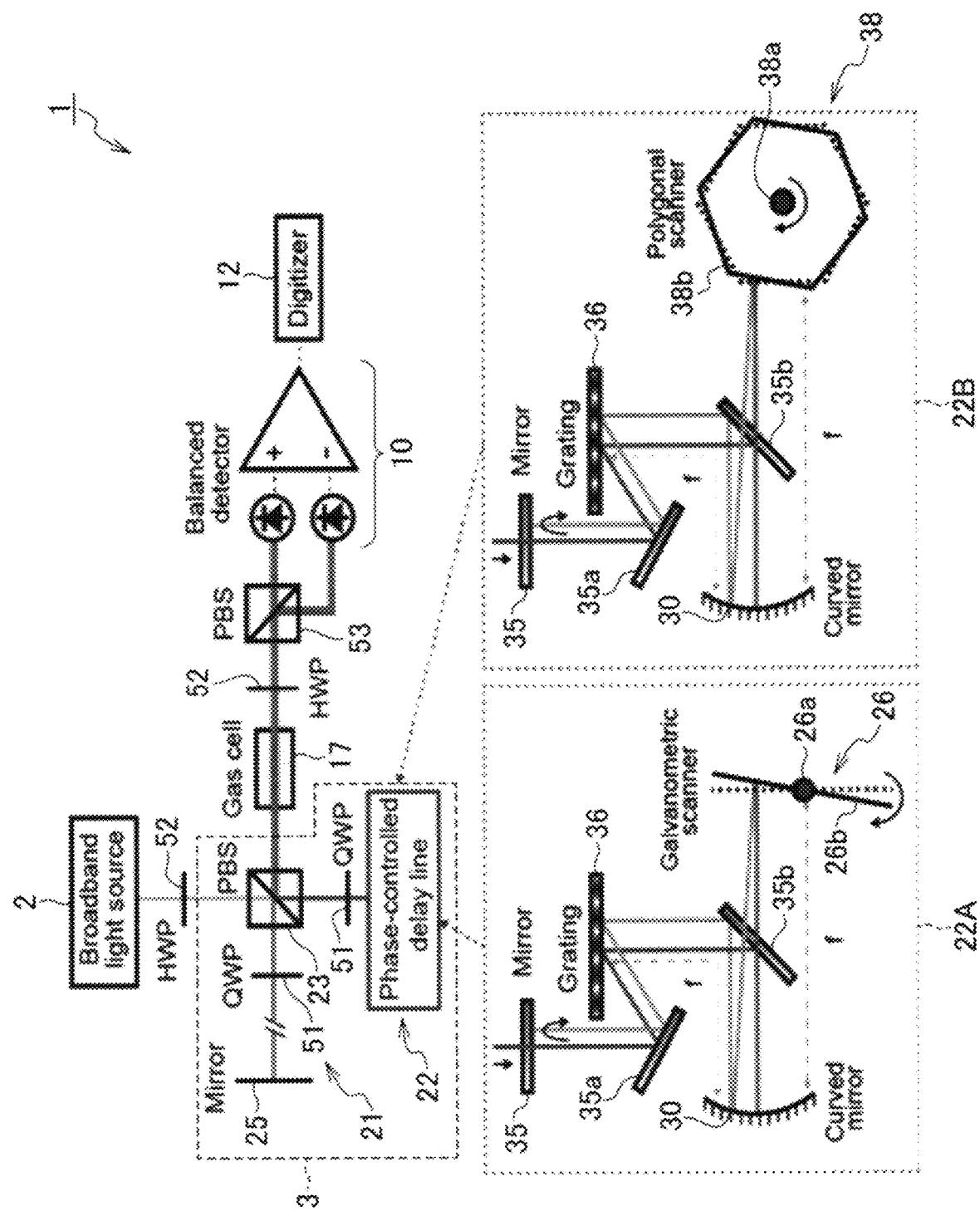
FIG. 7 is a detailed view showing the Fourier-transform spectroscopy apparatus shown in FIG. 1.

As shown in FIGS. 1, 7, and 13 for exemplary purposes, a Fourier-transform spectroscopy apparatus 1 according to an embodiment includes: a beam splitter 23 that splits light 13 emitted from a light source 2 into reference light 14R and scanning light 14S; a first arm (which will also be referred to as a "reference arm") 21 that reflects the reference light 14S by a first mirror 25 so as to re-input the reflected light to the beam splitter 23; and a second arm (which will also be referred to as a "scanning arm") 22 that reflects the scanning light 14S by a second mirror 35 so as to re-input the reflected light to the beam splitter 23. Furthermore, the Fourier-transform spectroscopy apparatus 1 includes an interferometer 3 that combines the reference light 14R and the scanning light 14 thus re-input to the beam splitter 23 so as to generate an interference wave 14. With this, either the light pulse 3 emitted from the light source 2 or the interference wave 14 combined by the beam splitter 23 is irradiated to a specimen 7. The Fourier-transform spectroscopy apparatus 1 further includes a spectroscopic spectrum generating unit 12 configured to generate an interferogram based on the light intensity of the detection target light acquired from the specimen 7, and to apply a Fourier transform to the interferogram thus generated.

In the Fourier-transform spectroscopy apparatus 1, as shown in FIG. 7 for exemplary purposes, a scanning mirror 26b or 38b is arranged on a light path of the scanning light 14S that propagates between the beam splitter 23 and the second mirror 35 in the second arm 22. The scanning light 14S is delayed or advanced with respect to the reference light 14R according to the rotational angle of the scanning mirror 26b or 38b from its initial position. Furthermore, in the present embodiment, the spectroscopic spectrum generating unit 12 corrects the "group delay" which is a delay between an envelope 18 (that represents an "envelope curve"; the same representation will be used in the following description) of the reference light 14R and an envelope 18 of the scanning light 14S. In addition, the spectroscopic spectrum generating unit 12 corrects the "phase shift" which represents phase deviation with respect to the carrier wave 19 between respective envelopes 18. This allows the group and the phase to be aligned at regular intervals.

With the Fourier-transform spectroscopy apparatus 1, the scanning mirror 26B or 38b are rotated so as to change the light path length of the scanning light 14S. This allows the scanning light 14S to be delayed or advanced with respect to the reference light 14R according to the rotational angle of the scanning mirror 26b or 38b from its initial position. Accordingly, this allows the scanning mirror 26b or 38b to be moved at a higher speed, thereby providing absorption spectroscopy with an improved spectrum acquisition speed. Furthermore, the spectroscopic spectrum generating unit 12 corrects the group delay between the envelope 18 of the reference light 14R and the envelope 18 of the scanning light 14S that occurs due to the movement of the scanning mirror. Furthermore, the spectroscopic spectrum generating unit 12 corrects the phase shift with respect to the carrier wave 19 in each envelope 18. This allows the group and the phase to be aligned at regular intervals, thereby providing high-speed scanning Fourier-transform spectroscopy in absorption spectroscopy. It should be noted that the Fourier-transform spectroscopy apparatus 1 may include a different optical element as necessary.

It should be noted that, in the Fourier-transform spectroscopy apparatus 1 shown in FIG. 7, after the light has passed through the polarization beam splitter 23, it passes through an outer side of the second mirror 35, and is reflected by the mirror 35a. The reflected light is diffracted by a dispersive optical element 36, following which the diffracted light is reflected by the mirror 35b. Subsequently, the reflected light is focused to the scanning mirror 26b or 38b by a curved mirror 30. It should be noted that the light reflected by the curved mirror 30 passes through the outer side of the mirror 35b. The light reflected by the scanning mirror 26b or 38b passes through the outer side of the mirror 35b, and is reflected again by the curved mirror 30, the mirror 35b, the dispersive optical element 36, and the mirror 35a in this order. Subsequently, the reflected light reaches the second mirror 35. The light reflected by the second mirror 35 returns to the polarization beam splitter 23 via the same light path.

Correction

Description will be made with reference to FIG. 2 regarding the outline of the correction. With absorption spectroscopy using the Fourier-transform spectroscopy apparatus 1 as shown in FIGS. 1 and 7, in a case in which the scanning mirror 26b shown in FIG. 2 is moved in a linear manner or in a nonlinear manner, an interference wave as shown in FIG. 2D is detected. The interference wave includes the scanning light 14S and the reference light 14R as shown in FIG. 2C, and the scanning light 14S and the reference light 14R are configured with a group delay and a phase shift. It should be noted that FIGS. 2A and 2B show how the interferogram is acquired in each time region. In each time frame, a linear spectrum phase ramp is acquired in proportion to the angle of the scanning mirror 26b or 38b included in a delay line in the second arm 22. The linear spectrum phase ramp exhibits the group delay and the phase shift as shown in FIG. 2C. FIG. 2E shows a spectrum waveform of the interferogram shown in FIG. 2D.

Regarding the relation between the scanning light 14S and the reference light 14R, a group delay occurs in the envelope 18 of the scanning light 14S with respect to the envelope 18 of the reference light 14R. Furthermore, a phase shift occurs in the carrier wave in each envelope 18. In a case in which the interference wave 14 having such a group delay and phase shift is directly subjected to a Fourier transform, there will be distortion in the spectrum. With the present embodiment, the two degrees of freedom that produce such a phenomenon, i.e., the group delay that occurs in the envelope 18 of the scanning light 14S with respect to the reference light 14R and the phase shift of the carrier wave 19 included in the envelope 18 with respect to the reference light 14R, are corrected by the spectroscopic spectrum generating unit 12, such that the group and phase are aligned at regular intervals. Such correction provides high-speed scanning Fourier-transform spectroscopy in absorption spectroscopy. It should be noted that, in a case of supporting Raman spectroscopy, only the group delay may preferably be corrected. However, absorption spectroscopy requires both the group delay and the phase shift to be corrected before the Fourier transform.

A phase shift occurs in the carrier wave 19 in a nonlinear manner with respect to time. The change in the phase shift with time that occurs with respect to a given wavelength is determined by a pivot position and a position to which light is irradiated. On the other hand, the group delay also occurs in the envelope 18 in a nonlinear manner with respect to time. The group delay is uniquely determined based on information with respect to the change in the phase shift with time for two wavelengths. In a situation in which the phase shift and the group delay occur in a nonlinear manner as described above, the Fourier transform of the interference wave 14 will be distorted due to such two factors. Accordingly, correction is required. As such a correction method, the change in phase shift with time may preferably be monitored for at least two wavelengths, thereby providing the correction of the two factors described above. Specifically, the following approaches are conceivable.

(1) A method in which the phase shift is measured by experiment for two wavelengths, and the delay amount is corrected based on the measurement results such that the phase and the group are aligned at regular intervals.

(2) A method in which a phase shift curve and a group delay curve are assumed based on theoretical equations so as to correct the delay amount such that the phase and the group are aligned at regular intervals.

(3) A phase shift curve and a group delay curve are generated and optimized by machine learning such that they match a spectrum waveform so as to provide correction such that the phase and the group are aligned at regular intervals.

Figure 13A:
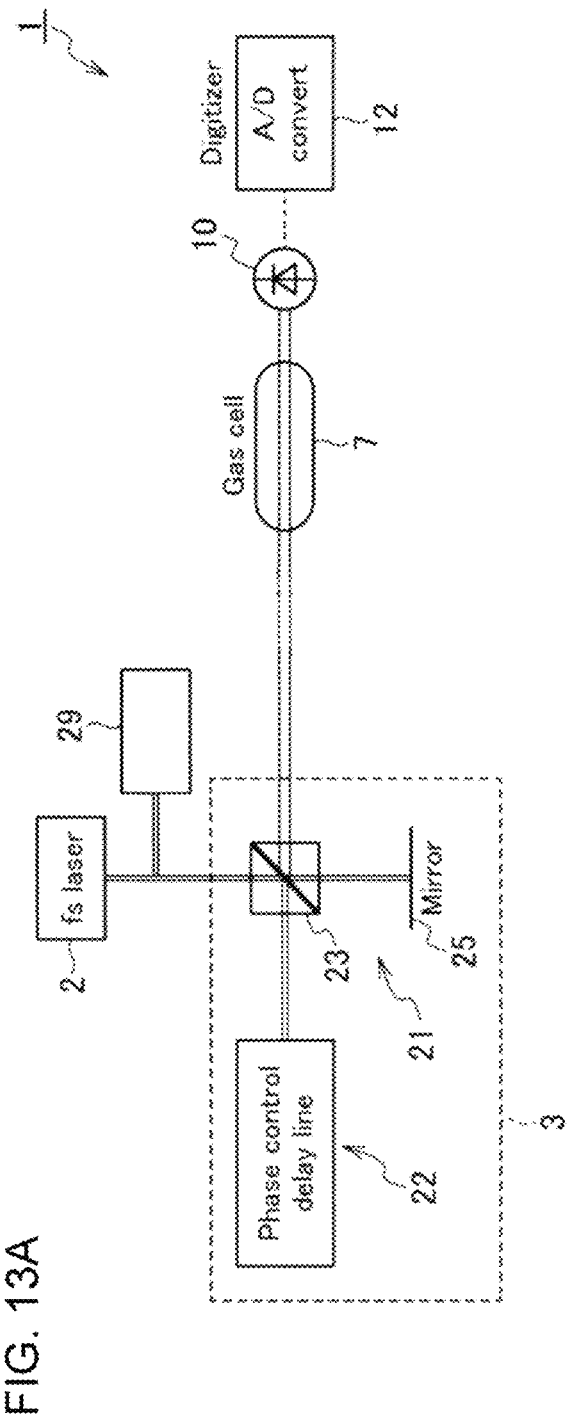
FIGS. 13A and 13B are schematic diagrams each showing yet another example of the Fourier-transform spectroscopy apparatus, and specifically.
Figure 13B:
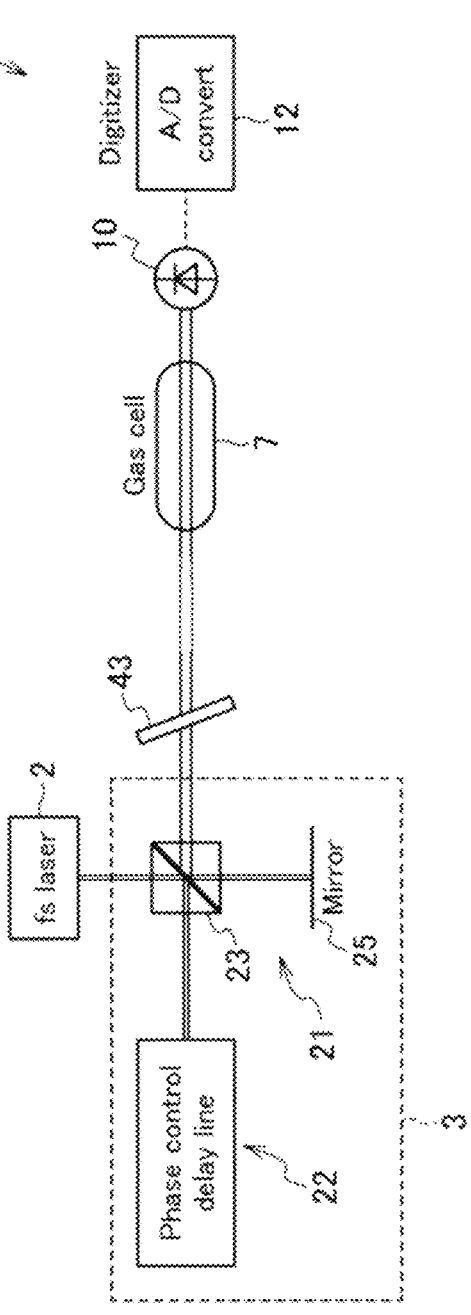

The group delay and the phase shift are acquired for each of two different frequencies. With such an arrangement, the two different frequencies may be generated as: (i) different frequencies obtained from two light sources 2 and 29 as shown in FIG. 13A; or (ii) different frequencies obtained from a single light source via a bandpass filter 43 or the like as shown in FIG. 13B. In other words, the nonlinearities of the group delay and the phase shift may be corrected (i) using two light sources prepared as additional light sources that support different wavelengths, or (ii) using two different wavelengths obtained by filtering light emitted from the light source to be used for absorption spectroscopy. It can be said that examples of the latter method (ii) include correction based on two different wavelengths obtained by filtering or wavelength conversion of light emitted from a single light source prepared as an additional light source. It should be noted that examples of an embodiment of the bandpass filter 43 include a fiber Bragg grating, etc.

Furthermore, the group delay and the phase shift may each be corrected as follows. (I) The group delay and the phase shift that occur in the scanning light 14S with respect to the reference light 14R may be measured by experiment, and the group delay and the phase shift may each be corrected based on the measurement results. (II) A phase shift curve and a group delay curve may be assumed based on theoretical equations, and the group delay and the phase shift may be corrected using the assumed results. (III) The phase shift curve and the group delay curve may be optimized by machine learning such that they match the shape of the spectrum, and the group delay and the phase shift may be corrected using the optimized results.

It should be noted that, in a case in which the specimen to be measured is restricted to a known material, a correction function can be derived by fitting based on theoretical equations. The measurement results of such a predetermined specimen can be corrected using the correction function thus derived. In contrast, in a case in which a large number of unknown specimens are to be measured, the optimization by machine learning as described in (III) is advantageous. For example, in a case in which a large amount of measurement data with various kinds of distortion of the phase shift curve and the group delay curve is acquired, optimization by machine learning is preferably applied to calculation of a correction function based on such a large amount of data thus acquired. With this method, by supporting the phase shift curve and the group delay curve thus calculated in the form of a software component, this arrangement allows the Fourier-transform spectroscopy apparatus to eliminate the need for a light source for correction. In addition, in a case in which the phase shift curve and the group delay curve are to be modified, the phase shift curve and the group delay curve may be updated by machine learning as an upgrading operation.

As the specific correction method, several correction methods can be conceived. For example, as shown in FIG. 13A, a light pulse 13 emitted from the light source 2 is input to the Michelson interferometer 3, and the output light is detected by a photodetector 10, thereby acquiring data. Furthermore, another light source 29 (e.g., CW laser or the like that supports a single wavelength) that supports a different wavelength is further provided. The light emitted from the light source 29 is further input to the Michelson interferometer 3. The output light from the Michelson interferometer 3 is detected by the photodetector 10, thereby acquiring data. The data thus acquired is represented by a delay function with respect to time, which allows the carrier wave 19 to be extracted. However, in a case in which the interferometer 3 is moved in a nonlinear manner, the carrier wave 19 is derived in a distorted form with its period gradually changing with time. Accordingly, such a signal can be used for correction.

The two wavelengths of light to be used may be supplied using two lasers. Also, light emitted from a single laser may be split into two different wavelengths to be used. Subsequently, the different wavelengths of light are input to the Michelson interferometer 3, and the output interference wave is detected by the photodetector 10. The data thus acquired is used for the correction in the same manner. It should be noted that the two wavelengths of the interference wave may be separately acquired, or may be acquired at the same time. The measurement results of one pair of wavelength signals thus acquired are used for the correction. With the present embodiment, two degrees of freedom are to be corrected. Accordingly, different wavelengths of light are input to the Michelson interferometer 3, and the interference waves of the respective data thus output are used for the correction.

Each Component

Description will be made regarding each component. The Fourier-transform spectroscopy apparatus 1 according to the embodiment is configured including at least a light source 2, a Michelson interferometer 3, a photodetector 10, and a spectroscopic spectrum generating unit (digitizer) 12.

4F Optical System

Figure 8A:
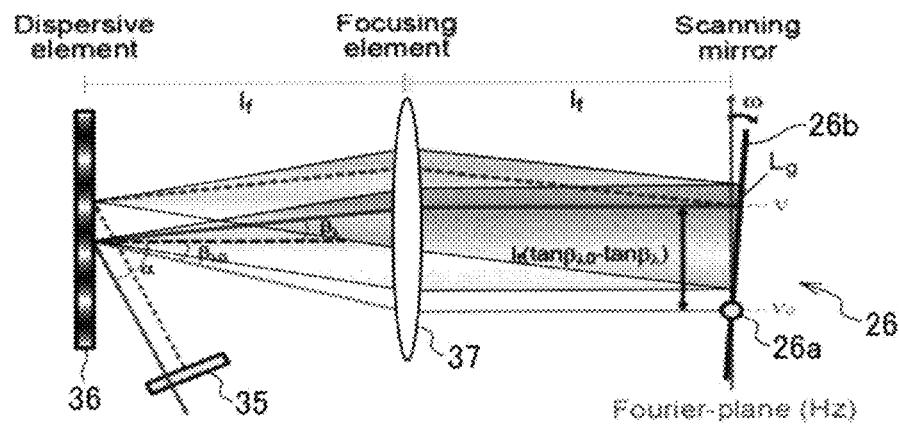
FIGS. 8A and 8B are explanatory diagrams for explaining a phase-controlled scanning mechanism, and specifically.
Figure 8B:
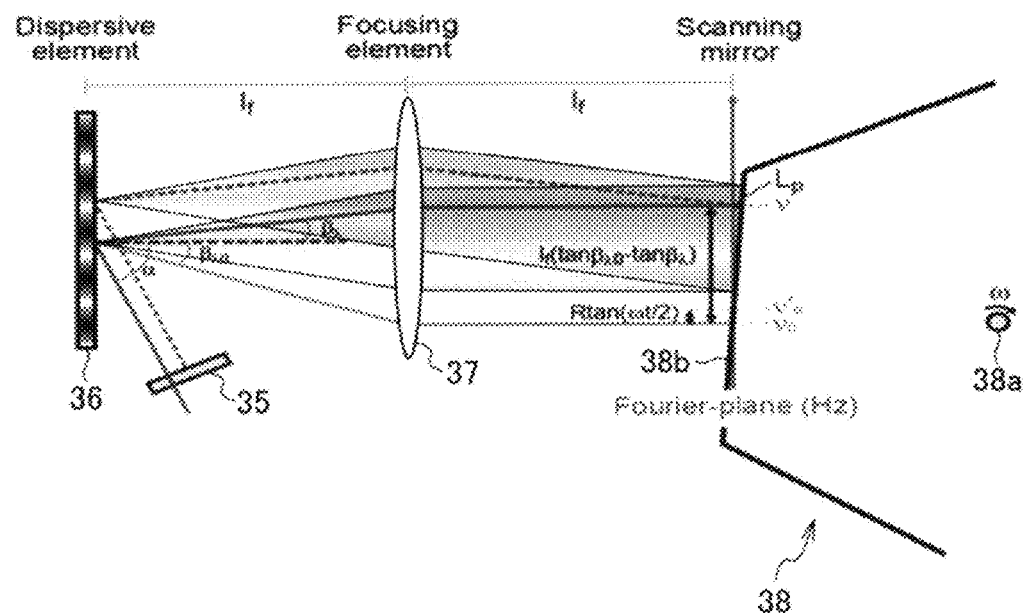

In the example shown in FIGS. 1, 7, and 8, the second arm 22 of the interferometer 3 is configured including a second mirror 35, a dispersive optical element 36, a focusing optical element 37, and a scanning mirror 26b or 38b. In this case, the distance between the focusing optical element 37 and the scanning mirror 26b or 38b and the distance between the focusing optical element 37 and the dispersive optical element 36 are each designed to be the same as the focal length f of the focusing optical element 37. That is to say, a so-called "4f optical system" is provided. As a result, broadband light is focused on a Fourier plane of the 4f optical system such that the spectrum components are mapped to different positions on the Fourier plane after they are separated by a dispersive element. The scanning mirror 26b or 38b is driven such that its angle is changed at an angular frequency ω, thereby reflecting the light input in an oblique direction. The scanning light 14S that propagates via the 4f optical system is retro-reflected by the second mirror 35, and is returned via the same light path. With the 4f optical system, the scanning light 14S returns along the incident light path regardless of the angle of the scanning mirror 26b or 38b. Accordingly, with such a scanning mirror 26b or 38b, the Fourier-transform spectroscopy apparatus 1 according to the embodiment functions as a high-speed scanning Fourier-transform spectroscopy apparatus. It should be noted that the optical frequency on the Fourier plane that corresponds to the pivot position of the scanning mirror 26b or 38b is indicated by ν0 in FIG. 2.

Light Source

The light source 2 is not restricted in particular. A coherent mode-locked laser may be employed. Also, incoherent amplified spontaneous emission light emitted from a superluminescent diode that functions as a broadband light source may be employed. Examples of a coherent mode-locked laser include a fiber laser, semiconductor laser, and a solid-state laser. On the other hand, examples of a light source that emits incoherent amplified spontaneous emission light include ordinary lamp light sources, LED, SLD, sunlight, etc. That is to say, a desired light source configured to emit so-called incoherent light may be employed. It should be noted that, in experimental examples described later, a coherent mode-locked doped-fiber laser (Femtolite CS-20-GS, IMRA) or an incoherent superluminescent diode (S5FC1005S, Thorlabs) is employed. In a case in which two light sources are employed as shown in FIG. 13A, a single-wavelength CW laser or the like is employed as an additional light source 29 that supports a different wavelength.

Interferometer 3

The interferometer 3 is configured as a scanning Michelson interferometer, which is configured to change a time delay between the beams that propagate along the first arm (reference arm) and the second arm (scanning arm), thereby providing an autocorrelation trace, which is a so-called interferogram. The light interference magnitude that occurs in the autocorrelation trace is converted by the photodetector 10 into an electrical signal (analog signal). Furthermore, the electrical signal is sampled by a digitizer (spectroscopic spectrum generating unit), thereby generating a digital signal.

FIG. 7 shows an example of the interferometer 3. In this example, the dispersive optical element 36 including a reflection grating having 600 lines/mm and a curved mirror 30 having a focal length of 150 mm are employed as a dispersive component and a focusing component, respectively. With such components, the number of the grooves of the grating that forms the dispersive optical element 36 and the focal length of the curved mirror 30 may be designed as desired in order to optimize the system.

The scanning mirror is included in a light scanning element configured to change the angle of the input light. Conceivable examples of light scanning elements include a movable scanner such as a polygon scanner, resonant scanner, galvanometric scanner, or the like, a MEMS scanner, an electro-optical crystal scanner, an acousto-optical scanner, etc. FIG. 7 shows the scanning mirror 26b included in a galvanometric scanner 28 and the scanning mirror 38b included in a polygon scanner 38. Also, the scanning mirror included in the light scanning element may be configured as a resonant scanner (not shown). The scanning mirror 26b included in the galvanometric scanner 28 is driven by periodic motion provided by a mechanism that rotates with a rotational axis 26a as the center of rotation. The scanning mirror 38b included in the polygon scanner 38 is configured to have a polygonal column shape, and to rotate with a rotational axis 38a as a center of rotation. The scanning mirror included in the resonant scanner is driven by a rotation mechanism using resonant motion.

It should be noted that the scanning mirrors 26b and 38b are each configured such that its surface is coated with gold so as to provide a mirror surface. The galvanometric scanner 26 that can be employed has a facet size of 10 mm. The polygon scanner 38 that can be employed has facets each designed to have a facet size of 5.6 mm, as an example. The polygon scanner 38 is designed to have an inner diameter of 63.6 mm. In experiments, the polygon scanner 38 that can be employed may be driven at a rotational speed of 20,000 rpm or 40,000 rpm. It should be noted that description has been made above for exemplary purposes only. Also, different sizes may be selected as desired.

The light collimated by the second arm 22 is split into two beams by means of a desired optical element such as a polarization beam splitter, polarization-independent beam splitter, or the like. In addition, a desired wave plate 51 may be provided as necessary. This arrangement is configured to allow the two output beams (reference light 14R and scanning light 14S) output from the interferometer 3 to be adjusted with a power ratio of 50:50. In the example shown in FIG. 7, a quarter-wave plate 51 is arranged on each of the first arm 21 and the second arm 22. Such a wave plate 51 rotates the polarization angle of the reflected light by 90 degrees. Accordingly, the recombined interference wave 14 having an orthogonal polarization is output from an output port of the interferometer 3.

The interference wave 14 passes through a specimen. As such a specimen, various kinds of measurement targets can be employed. Examples of the specimens include a gas containing $H^{12}C^{14}N$ or $^{12}C_2H_2$ etc., as described later in the experiment examples.

The photodetector 10 is configured to detect the interference wave 14 that has passed through the specimen 7, and to convert the detection result into an electrical signal. The photodetector 10 is not restricted in particular. Examples of such a photodetector include an InGaAs balanced photodetector (PDB415C-AC, Thorlabs). It should be noted that, in order to balance the signal output from a photodiode, a half-wave plate 52 or a polarization beam splitter 53 is preferably arranged.

Spectroscopic Spectrum Generating Unit

A PC 12 that functions as a spectroscopic spectrum generating unit mounts a digitizer board. The PC 12 is coupled to the digitizer board via a conductive wire. In a case of employing a mode-locked laser, an electrical signal having a given magnitude configured as the detector signal is subjected to low-pass filtering at a frequency of 21 MHz, following which it is subjected to analog/digital (A/D) conversion by means of the digitizer board. The electrical signal thus subjected to analog/digital (A/D) conversion is stored along with the detection time in a storage apparatus (not shown) of the PC 12 as electronic data. The kind of the digitizer board is not restricted in particular. A desired kind of digitizer board that is capable of measuring a waveform with time may be selected and employed. For example, a typical oscilloscope may be employed. Also, ATS9440 manufactured by the AlazarTech corporation or the like, which is employed in the present specification, may be employed. The time domain data thus digitized is divided into individual interferograms. After phase correction, each interferogram is subjected to a Fourier transform.

Experimental Example 1

Figure 3A:
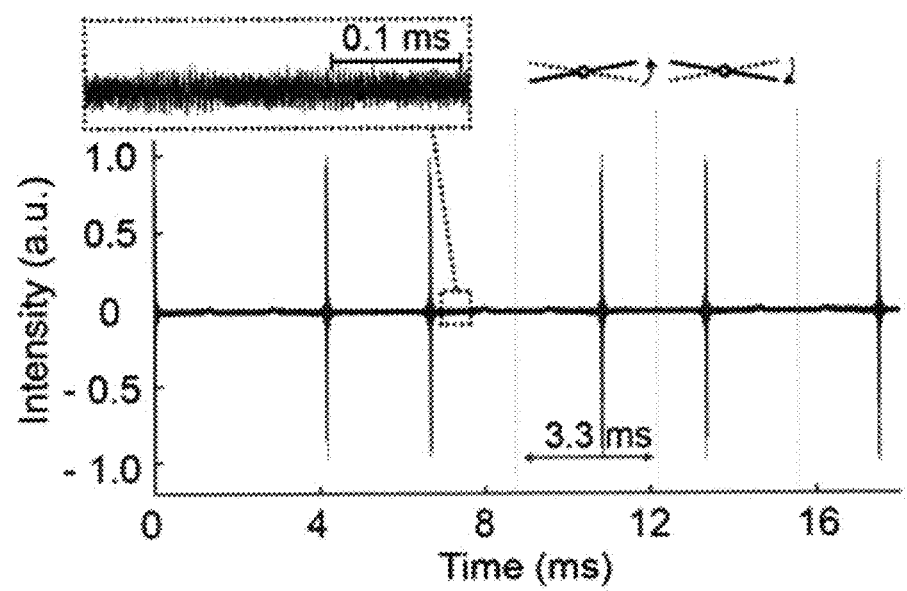
FIGS. 3A and 3B show an example of broadband absorption spectroscopy measurement of $H^{12}C^{14}N$ obtained by a phase-controlled FTS using a galvanometric scanner, and specifically.
Figure 3B:
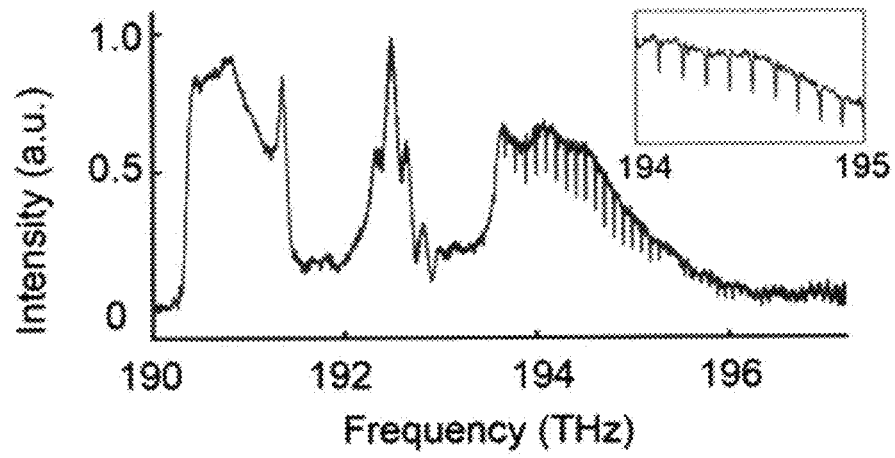

FIG. 3 shows an example of broadband absorption spectroscopy measurement of $H^{12}C^{14}N$ molecules by means of phase-controlled FTS based on a galvanometric scanner. FIG. 3A shows an example of a continuous interferogram of $H^{12}C^{14}N$ measured by a mode-locked laser. FIG. 3B shows a broadband spectrum acquired by applying a Fourier transform to a single interferogram.

In the example shown in FIG. 3, a fiber mode-locked laser configured to generate a femtosecond pulse at a repetition frequency of 50 MHz is employed. After applying correction (phase correction) according to the embodiment, a one-sided interferogram is subjected to a Fourier transform, thereby obtaining a broadband spectrum of 7 THz or more with a resolution of 10.1 GHz as shown in FIG. 3B. With this, a sharp absorption line of the HCN vibration band can be clearly observed. It should be noted that the resolution of 10 GHz corresponds to a maximum light path length difference of 30 mm defined by only the tilting angle of the scanning mirror 26b shown in FIG. 1. In this example, the scanning speed is 300 Hz (which corresponds to time intervals of 3.3 ms). In this example, the Nyquist range (0 to 25 MHz) is determined by the pulse repetition frequency of the mode-locked laser. However, with the measurement using the galvanometric scanner, the entire Nyquist range cannot be used. In order to use the entire Nyquist range, the polygon scanner 38 shown in FIG. 7 is preferably employed instead of employing the galvanometric scanner. This allows the entire Nyquist range to be completely used, thereby allowing a maximum scanning rate to be designed based on the Nyquist limit.

Experimental Example 2

Figure 4:
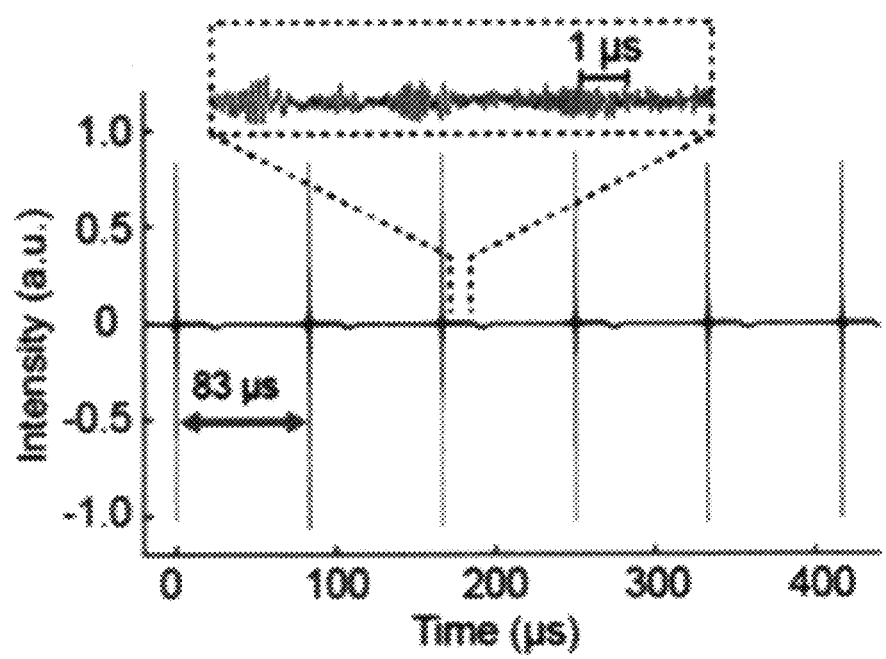
FIG. 4 shows an interferogram continuously measured using a mode-locked laser in broadband absorption measurement with high scanning speed by means of a phase-controlled mechanism using a polygon scanner.
Figure 5:
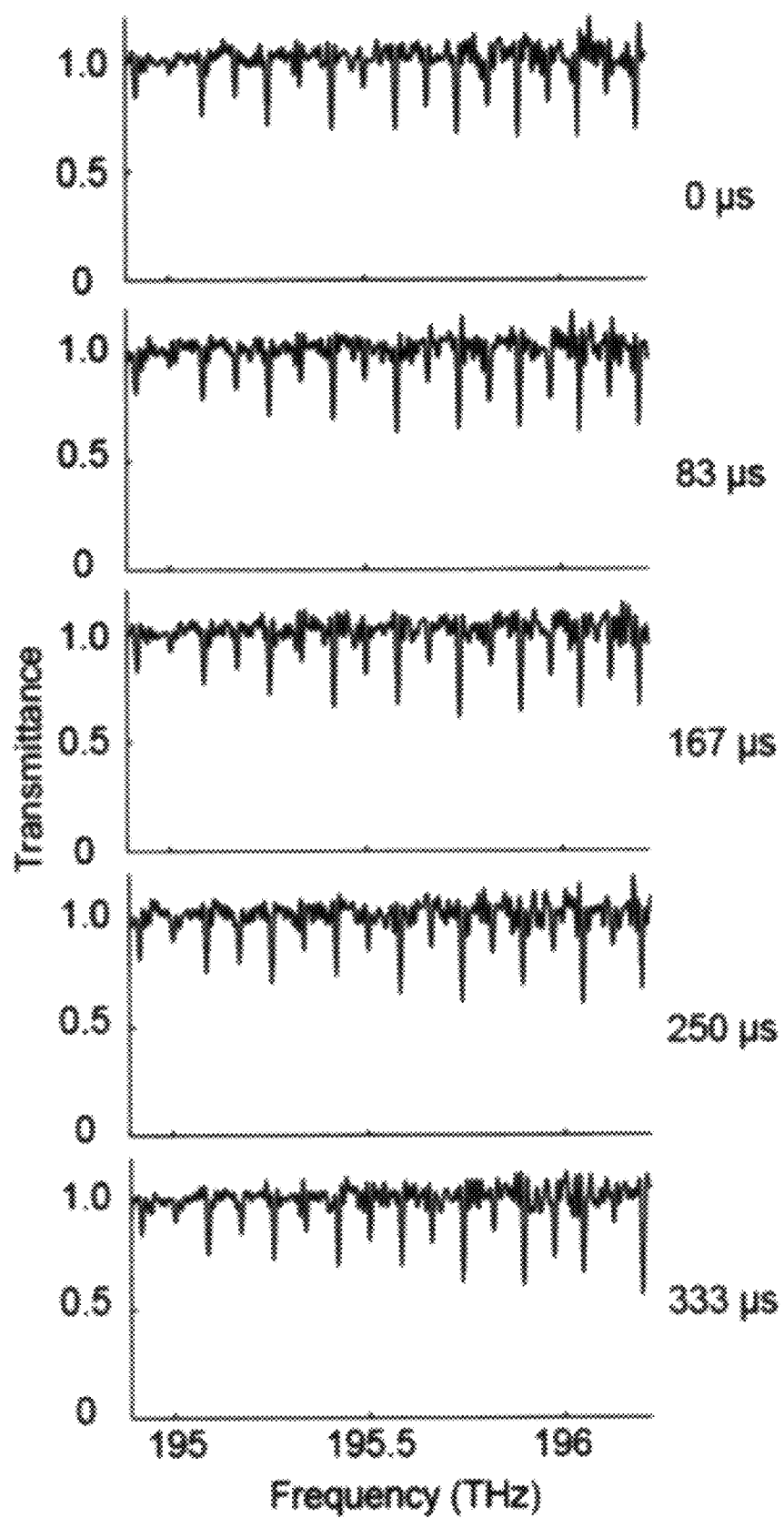
FIG. 5 shows a non-averaged transmission spectrum that corresponds to the interferogram shown in FIG. 4.
Figure 6:
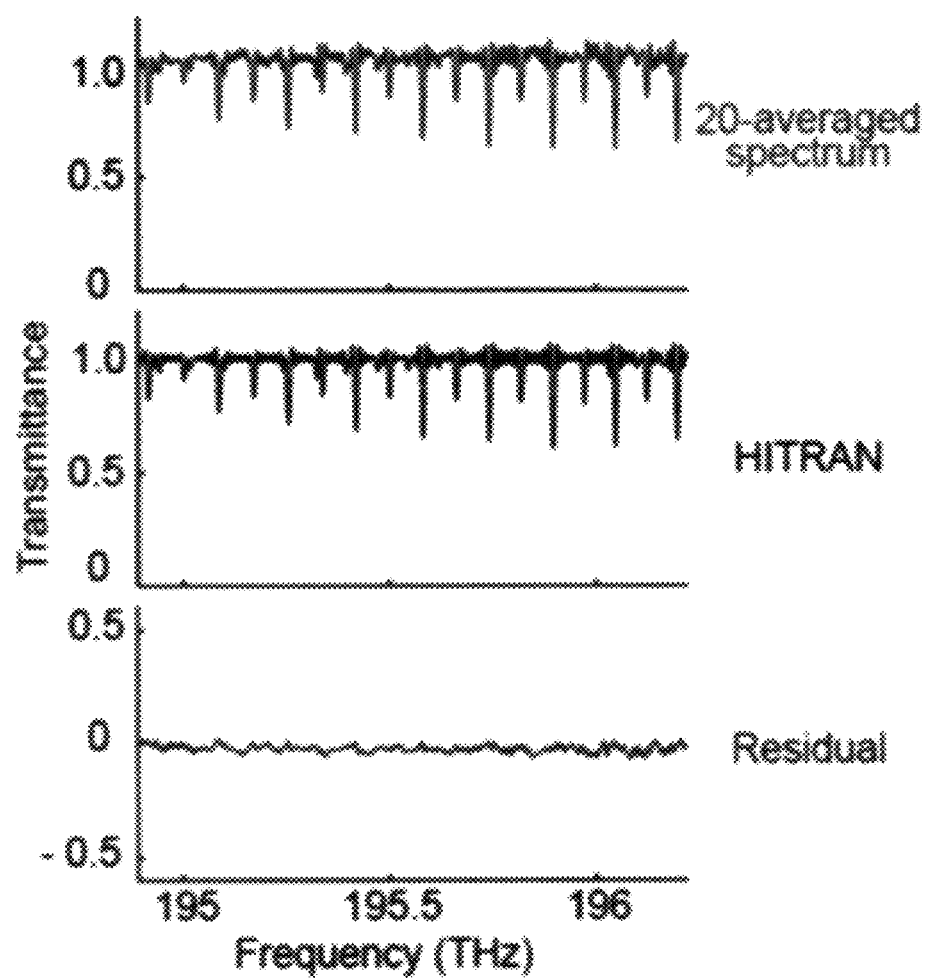
FIG. 6 shows a comparison between a 20-averaged spectrum and a spectrum calculated based on the HITRAN database.

FIGS. 4 through 6 show the results of the broadband absorption spectroscopy measurement for $^{12}C_2H_2$ molecules performed at a high scanning speed by phase control using a polygon scanner. FIG. 4 shows an interferogram continuously measured using a mode-locked laser. FIG. 5 shows a transmission spectrum that corresponds to the interferogram without averaging. FIG. 6 shows a comparison between a 20-averaged spectrum and a spectrum calculated based on the HITRAN database. It should be noted that FIG. 6 shows that the standard deviation of the residual is 1.7%.

FIG. 4 shows an interferogram measured continuously at a high rotation speed of the polygon scanner 38. In the drawing, bursts occur in the interferogram every 83 μs, which corresponds to a scanning rate of 12 kHz. In the interferogram, a modulation due to molecular free-induction decay can be clearly observed.

Each transmission spectrum shown in FIG. 5 is a spectrum without averaging that corresponds to the corresponding interferogram. Each spectrum provides a band of 1.5 THz or more with a resolution of 11.5 GHz. This allows the absorption lines of C2H2 to be clearly observed. In this example, Savitzky-Golay filtering is used to normalize the spectrum, thereby converting the magnitude data into transmittance. It should be noted that such an arrangement provides an effective scanning speed of 312 m/s, which is several orders greater than that provided by conventional delay lines. It can be considered that noise occurs in a spectrum mainly due to side modulation of a sinc function that occurs in rectangular Fourier-transform window processing.

Description has been made with reference to FIGS. 4 through 5 regarding the experiment employing the mode-locked laser. Also, an incoherent light source may be employed. This technique is applicable to other wavelengths including the mid-infrared region that corresponds to typical molecular vibration modes. There is no known high-quality mid-infrared detector array of the kind required for high-speed dispersion spectroscopy. Accordingly, a single-photon detector operation based on Fourier-transform spectroscopy has a particular advantage in measurement in the mid-infrared region. Furthermore, phase-controlled Fourier-transform spectroscopy is useful for measurement of liquid-phase materials and solid-phase materials in addition to gas-phase materials. Furthermore, with this technique, a combination of the scanning speed, spectrum bandwidth, and resolution can be selected as desired. For example, by decreasing the spectrum resolution while maintaining the scanning rate, this arrangement allows a wider spectrum bandwidth measurement to be supported. Also, such a high-efficiency Fourier-transform spectroscopy method may be modified to be applied to a multidimensional Fourier-transform spectroscopy method.

Experimental Example 3

The Fourier-transform spectroscopy apparatus 1 shown in FIG. 7 has the same configuration as that as described above. Accordingly, description thereof will be omitted. FIG. 8 is an explanatory diagram for explaining a scanning mechanism phase-controlled by the scanning mirror 26b or 38b included in the Fourier-transform spectroscopy apparatus 1 shown in FIG. 7. FIG. 7A is a schematic diagram showing a delay line using the galvanometric scanner 26. FIG. 7B is a schematic diagram showing a delay line using the polygon scanner 38.

Phase Correction

Such a delay line thus phase controlled generates a phase shift that is nonlinear with respect to time. Accordingly, the phase of the interferogram must be corrected before the Fourier transform. In order to correct both the non-linear phase shift and the non-linear group delay into a linear phase shift and a linear group delay, two calibration curves for correcting two parameters are required. Such calibration curves can be acquired by measuring a continuous wave (CW) interferogram at two different light frequencies. Such correction can be performed using the acquired calibration curves according to a procedure described above in the section [CORRECTION].

The calibration curve is measured using an external cavity laser diode that supports a line width that is smaller than 500 kHz. In a case of measuring HCN, the CW interferogram is measured for each of two different frequencies of 195.51 THz and 194.50 THz. In a case of measuring C2H2, the CW interferogram is measured for each of two different frequencies of 196.41 THz and 195.51 THz. Such measurement can be performed with high precision using an optical frequency comb method. As a simple example, the measurement can be made with a laser frequency precision of ±2.6 GHz using an optical spectrum analyzer (e.g., AQ6317B manufactured by Yokogawa Test & Measurement Corporation).

Figures 9A, 9B:
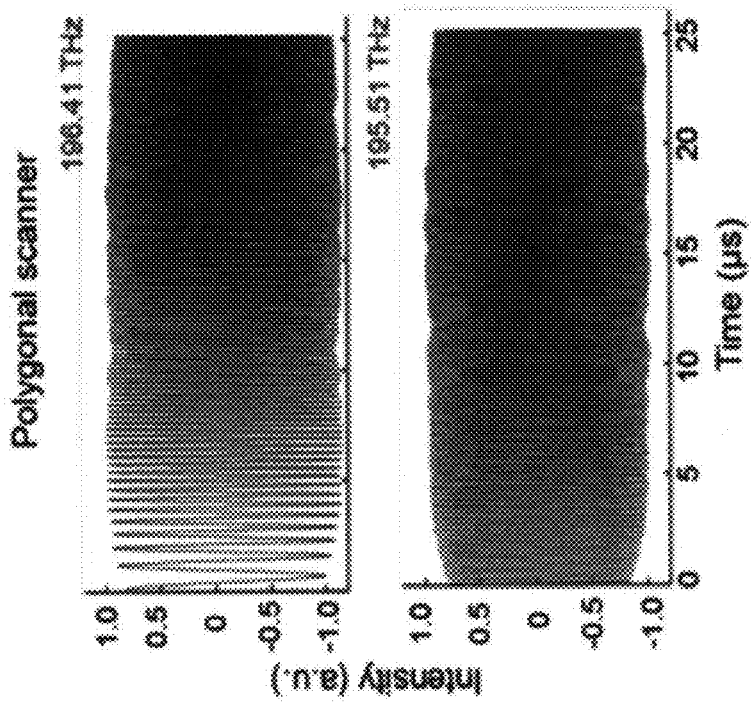
FIGS. 9A through 9D show an example of continuous wave interferograms measured for two different frequencies with the phase shift and the group delay applied by the delay line.
Figures 9C, 9D:
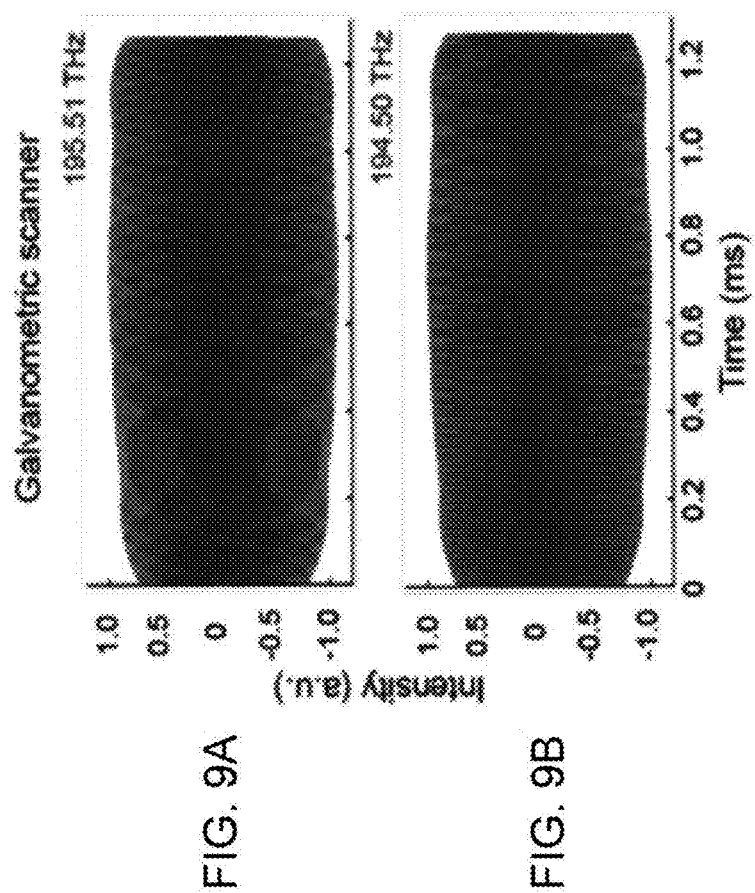

FIGS. 9A through 9D show examples of continuous wave (CW) interferograms measured with two different frequencies with respect to the phase shift and the group delay applied by the delay line. FIGS. 9A and 9B show the measurement data acquired using the galvanometric scanner 26. FIGS. 9C and 9D show the measurement data acquired using the polygon scanner 38. The fact that such a phase has nonlinearity can be clearly understood based on the data measured using a system employing the polygon scanner 38. FIG. 10 is an explanatory diagram for explaining the phase shift that occurs in the CW interferogram acquired in the example shown in FIG. 9. FIG. 11 is an explanatory diagram for explaining the group delay calculated based on the phase shift data acquired at the two different frequencies in the example shown in FIG. 9. In the experimental results, the maximum group delay of 100 ps was acquired, which corresponds to a spectrum resolution of 10 GHz.

Figure 10A:
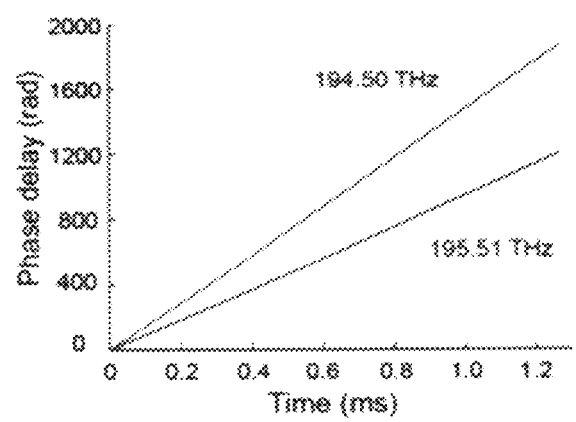
FIGS. 10A and 10B are explanatory diagrams for explaining the phase shift that occurs in a CW interferogram.
Figure 10B:
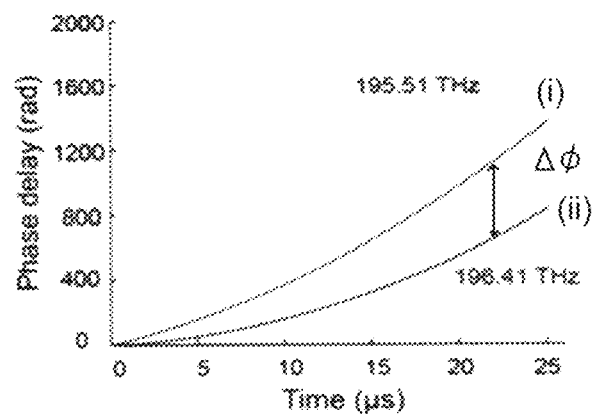
Figure 11A:
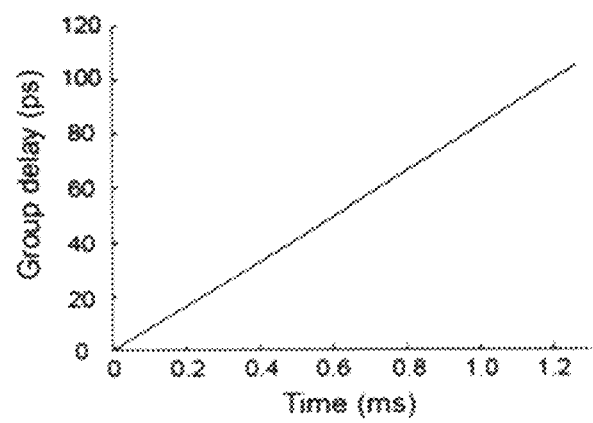
FIGS. 11A and 11B are explanatory diagrams for explaining the group delay calculated based on the phase shift curves acquired at two different frequencies.
Figure 11B:
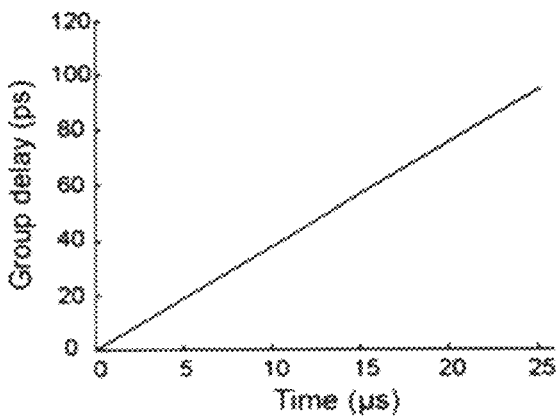

FIG. 11A shows a group delay curve obtained based on the two phase shift curves shown in FIG. 10A. In the same manner, FIG. 11B shows a group delay curve obtained based on the two phase shift curves shown in FIG. 10B. Such group delay curves can be calculated by dividing the difference $\Delta\phi$ between the two phase shift curves (i) and (ii) by the difference between the two frequencies, i.e., $\Delta f = f2 - f1$. The group delay is represented by the following Expression.

$$\tau = \Delta\phi/(2\pi\Delta f)$$

Description will be made regarding a specific correction procedure example based on the curves shown FIGS. 10B and 11B. The correction is performed in a two-step manner using both the phase shift curve shown in FIG. 10B and the group delay curve shown in FIG. 11B.

In the first step, an acquired interferogram is corrected using one from among the phase shift curves thus obtained in FIG. 10B. This corresponds to the correction of a state in which the phase shift occurs in a nonlinear manner according to the time shift. This allows the nonlinear phase shift that occurs in the interferogram to be corrected. However, a state in which the time shift itself, i.e., the group delay, changes in a nonlinear manner cannot be corrected. Such a nonlinear change in the group delay is corrected in the second step.

In the second step, the nonlinearity of the group delay that occurs in the interferogram is corrected using the group delay curve shown in FIG. 11B formed based on the two phase shift curves shown in FIG. 10B.

With such two-step processing, the temporal nonlinearity is corrected for both the phase shift and the group shift that occurs in the interferogram, thereby suppressing the occurrence of distortion in the spectrum after the Fourier transform.

It should be noted that, in the first step, in a case in which only a single phase shift curve is used, the frequency component that corresponds to the pivot side of the mirror, i.e., the spectrum component that corresponds to the pivot side with respect to the frequency employed in the phase shift curve, is not used in the calculation processing. In order to solve such a problem, a phase shift curve (iii) may be generated such that it reflects both the two phase shift curves (i) and (ii), so as to perform the first-step correction based on the phase shift curve (iii) thus generated. For example, with n as an integer, such a new phase shift curve (iii) may be generated based on an Expression such as n×(phase shift curve (i))−(n−1)×(phase shift curve (ii)).

Experimental Example 4

Figure 12A:
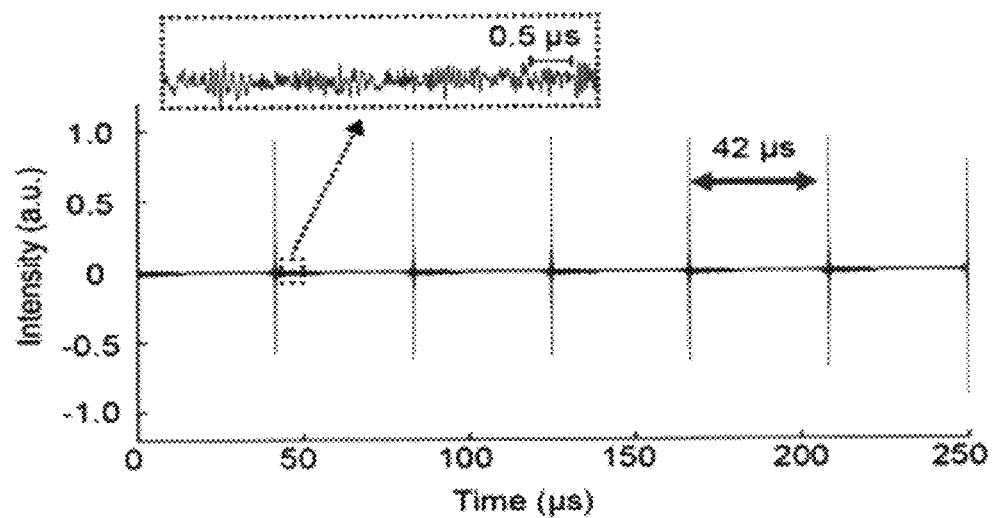
FIGS. 12A and 12B show an example of an interference wave and a spectrum measured by a phase-controlled Fourier-transform spectroscopy apparatus using an SLD light source, and specifically.
Figure 12B:
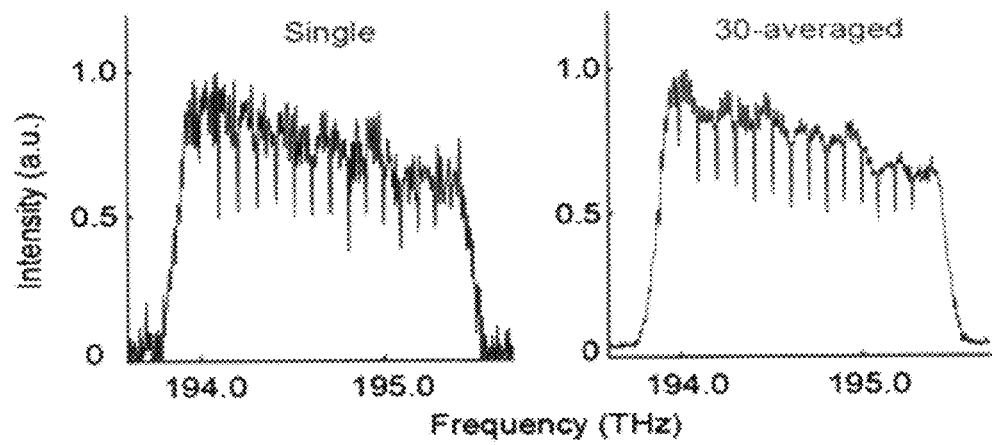

FIG. 12 shows an example of an interference wave and a spectrum measured by a Fourier-transform spectroscopy apparatus phase controlled using an SLD light source. Specifically, FIG. 12A shows a continuous interferogram of $H^{12}C^{14}N$ molecules measured using an SLD light source at a scanning speed of 24 kHz. FIG. 12B shows a spectrum obtained by subjecting a single interferogram to a Fourier transform (left-side graph) and a 30-averaged spectrum (right-side graph).

Modification with Respect to Correction

Description has been made above regarding an arrangement in which the measurement is performed with respect to two different frequencies (wavelengths) in order to support the correction of nonlinearity of the group delay and the phase shift. However, in some cases, it is difficult to prepare a light source that supports two frequencies. Description will be made below in several modifications regarding a technique for supporting the correction based on single-wavelength measurement.

Modification 1

In the modification, two calibration curves required to correct the two degrees of freedom are measured using a single wavelength (frequency).

Figure 14A:
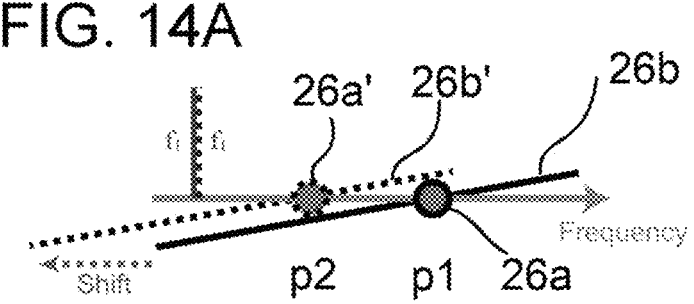
FIGS. 14A and 14B are diagrams each showing correction according to a modification 1.

FIG. 14A is a diagram for explaining the correction according to a modification 1. Assuming an example employing the scanning mirror shown in FIG. 1, in the modification 1, the pivot position (position of the rotational axis) 26a of the scanning mirror 26b can be moved on the Fourier plane in a direction that is orthogonal to the rotational axis 26a. In the drawing, "p1" indicates the position of the rotational axis 26a in the normal operation. In the calibration operation, the rotational axis 26a is shifted from the reference position p1, thereby moving the scanning mirror 26b on the same Fourier plane in a direction that is orthogonal to the rotational axis 26a.

The measurement for calibration is performed for at least two positions (p1 and p2) of the rotational axis 26a, which can be switched as shown in the drawing, in a state in which single-spectrum light having the same wavelength (frequency f1) is irradiated.

Figure 14B:
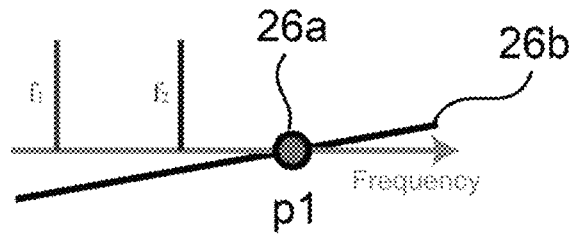

FIG. 14B is a diagram for explaining the correction in a case of employing two wavelengths. As can be understood based on a comparison between FIGS. 14A and 14B, the phase shift that occurs in the irradiated CW light having a frequency f1 in a state in which the position of the rotational axis 26a is shifted to p2 for calibration as shown in FIG. 14A is equivalent to the phase shift that occurs in the irradiated CW light having a frequency f2 in a state in which the position of the rotational axis 26a is fixed to P1.

Accordingly, with the modification 1, such an arrangement requires only a single frequency f1 to acquire the nonlinearity data of the phase shift with respect to time (or rotational angle) for each of both the frequencies f1 and f2.

Figure 15A:
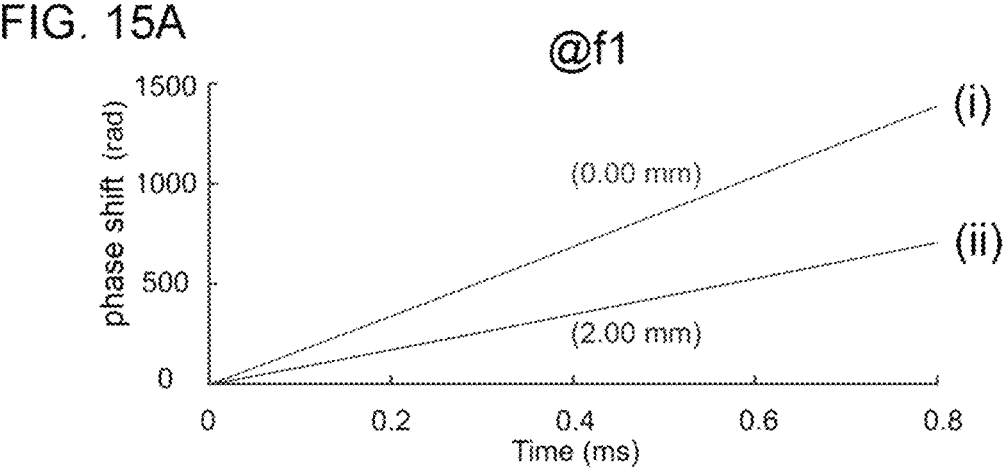
FIGS. 15A and 15B are diagrams for explaining calibration using only a single wavelength.
Figure 15B:
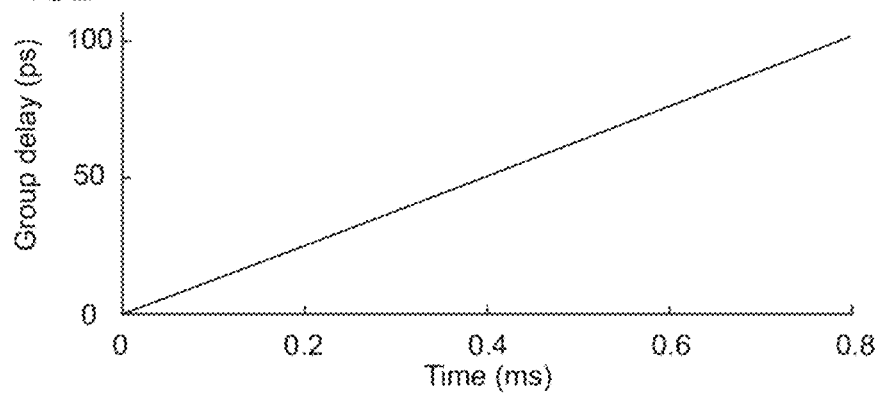

FIGS. 15A and 15B are diagrams for explaining the calibration using a single wavelength. FIG. 15A shows two phase shift curves (i) and (ii). One phase shift curve (i) is a calibration curve acquired when the position of the rotational axis 26a is set to p1 in a state in which light having a frequency f1 is irradiated. The other shift curve (ii) is a calibration curve acquired when the position of the rotational axis 26a is shifted to p2 (2 mm) in a state in which light having a frequency f1 is irradiated. In the drawing, the two phase shift curves (i) and (ii) each appear to be a straight line. However, in actuality, the two phase shift curves (i) and (ii) each increase non-linearly with respect to time.

The phase shift curve (ii) also represents a phase shift curve acquired for a frequency f2 that differs from the frequency 1 when the rotational axis 26a is set to p1.

FIG. 15B shows a group delay obtained based on the two phase shift curves shown in FIG. 15A. The group delay is calculated by dividing the phase difference Δϕ between the two phase shift curves (i) and (ii) by the frequency difference Δf=f2−f1 between the two frequencies. Specifically, the group delay is represented by the following Expression.

$$\tau = \Delta\phi/(2\pi\Delta f)$$

In this example, FIG. 15B shows an example in which f1=64.56 THz and F2=65.62 THz.

An arrangement employing a polygon mirror as shown in FIG. 7 may be modified in the same manner. Specifically, the rotational axis 38a may preferably be configured such that its position can be moved. That is to say, the rotational axis 38a may preferably be configured such that it can be moved on a plane that is parallel to the Fourier plane in a direction that is orthogonal to the rotational axis 38a. In this case, upon shifting the rotational axis 38a, the scanning mirror 38b is moved on the same Fourier plane in a direction that is orthogonal to the rotational axis 38a.

Modification 2

Figure 16:
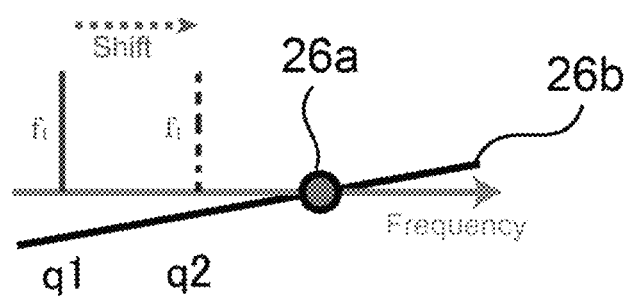
FIG. 16 is a diagram for explaining the correction according to a modification 2.

Description has been made in the modification 1 in which the rotational axis of the scanner mirror is shifted. Also, instead of (or in addition to) such a mechanism, the irradiation position of the calibration light having a single frequency f1 may be shifted between multiple points. FIG. 16 is a diagram for explaining the correction according to a modification 2. In this example, light of the frequency f1 is irradiated at a position q1 and at a position q2, which is different from the position q1 in the normal measurement. The phase shift curve acquired at the position q2 is equivalent to the phase shift curve acquired at the frequency f2 that differs from the frequency f1 of the calibration light.

The method for shifting the irradiation position is not restricted in particular. In order to support such a method, a part of the optical system shown in FIG. 1 or 7 may be changed. For example, the grating 36 may be tilted.

Modification 3

The Group Delay and the Phase Shift May be corrected based on theoretical calculations. That is to say, the correction may preferably be performed based on two theoretical calibration curves, i.e., the phase shift curve and the group delay curve obtained in a theoretical manner. The theoretical calculation has two degrees of freedom (i.e., the position relation between the pivot and the irradiation position on the mirror with respect to a given frequency, and the interval between given frequencies). Accordingly, after the theoretical curves are generated assuming the two degrees of freedom for calibration, an unknown spectrum may preferably be measured.

Applications

With the Fourier-transform spectroscopy apparatus according to the embodiment, it can be anticipated that this arrangement provides improved spectrum resolution, widened spectrum bandwidth, improved acquisition speed, and widened wavelength range.

It can be anticipated that the spectrum resolution can be improved such that the resolution on the order of 10 GHz supported by conventional techniques is raised to a spectrum resolution on the order of 3 GHz, for example. Furthermore, it can be anticipated that the spectrum bandwidth can be improved by adjusting an additional parameter such that it is widened from a spectrum bandwidth on the order of 1.5 THz supported by conventional techniques up to a spectrum bandwidth on the order of 10 THz. It can be anticipated that this technique is capable of distinguishing multiple molecular species. Moreover, it can be anticipated that the acquisition speed can be improved by adjusting an additional parameter such that the 12 kHz supported by conventional techniques is raised to a value on the order of 100 KHz. In addition, it can be anticipated that the wavelength range can be improved such that it is widened from the near-infrared region up to the mid-infrared region.

As a specific example, (1) the present invention is applicable to a satellite-mounted Fourier-transform spectroscopy apparatus. Satellite-mounted environmental-measurement Fourier-transform gas spectroscopy apparatuses have a wavelength resolution in the vicinity of 10 GHz. By applying the Fourier-transform spectroscopy apparatus according to the embodiment, this provides improved measurement speed, thereby improving the spatial resolution of the measurement. (2) Also, the present invention is applicable to a remote-sensing Fourier-transform spectroscopy apparatus. By applying the Fourier-transform spectroscopy apparatus according to the present invention, this allows the measurement speed to be improved, thereby allowing a wide wavelength range to be measured in a short period of time. For example, the present invention is applicable as a field-measurement Fourier-transform spectroscopy apparatus to various kinds of mobile systems that can be employed in various situations such as environmental measurement, exhaust gas measurement, volcanic gas monitoring, hazardous material monitoring, etc. (3) Also, the present invention is applicable to combustion gas measurement. For example, engine combustion is measured for automobiles or aircraft with a spectrum resolution of 10 to 20 GHz. By applying the Fourier-transform spectroscopy apparatus according to the embodiment, this allows the measurement speed and resolution to be improved, thereby contributing to understanding the combustion mechanism. (4) Also, the present invention is applicable to exhaust gas measurement. For example, engine combustion is measured for automobiles or aircraft with a spectrum resolution of 10 to 20 GHz. By applying the Fourier-transform spectroscopy apparatus according to the embodiment, this allows the measurement speed and resolution to be improved, thereby providing improved inspection efficiency. (5) In addition to the application described above, the present invention is applicable to food hygiene management, explosives management, and micro-infrared imaging. For example, the Fourier-transform spectroscopy apparatus according to the present invention can be applied to high-speed FT-IR screening of processed food such as high-speed FT-IR analysis of total trans fatty acid content that leads to an increase in LDA, which is effectively employed in countries such as the USA having a policy of mandatory labeling of processed food with respect to the trans fatty acid content. Also, as a method for analyzing industrial explosive products by means of FT-IR, the present invention can be applied so as to provide highly reliable measurement of explosive materials in a simple and remote manner. Also, the present invention can be applied as a method for providing an improved screening speed in high-speed screening of microscopic foreign matter by means of micro-infrared imaging such as a case in which foreign matter floating on an aqueous solution or foreign matter on a material surface are mapped by micro-infrared imaging (e.g., Nicolet Continuum XL, which is a micro-infrared imaging system manufactured by Thermo Fisher Scientific). It should be noted that such applications have been described for exemplary purposes only. That is to say, the Fourier-transform spectroscopy apparatus according to the embodiment is not restricted to such applications described above.

What is claimed is:

1. A Fourier-transform spectroscopy apparatus comprising:

an interferometer comprising a beam splitter structured to split light emitted from a light source into reference light and scanning light, a first arm structured to reflect the reference light by a first mirror such that it is re-input to the beam splitter, and a second arm structured to reflect the scanning light by a second mirror such that it is re-input to the beam splitter, wherein the interferometer is structured to combine the reference light and the scanning light re-input to the beam splitter so as to generate an interference wave; and a spectroscopic spectrum generating unit structured to generate an interferogram based on an intensity of detection light obtained from a detection target after either light emitted from the light source or the interference wave thus combined is irradiated to the detection target, and to apply a Fourier transform to the interferogram, wherein the second arm is configured such that a scanning mirror is arranged on a light path of the scanning light between the beam splitter and the second mirror so as to delay or advance the scanning light with respect to the reference light according to a rotational angle of the scanning mirror, and wherein the spectroscopic spectrum generating unit corrects a nonlinearity of a group delay with respect to the rotational angle, which is a delay of an envelope of the scanning light, and corrects a nonlinearity of a phase shift of a carrier wave included in the reference light with respect to the rotational angle.

2. The Fourier-transform spectroscopy apparatus according to claim 1, wherein, in a calibration step, the group delay and the phase shift are acquired for each of two different frequencies, and wherein the two different frequencies are different frequencies obtained from a single light source or different frequencies obtained from two light sources.

3. The Fourier-transform spectroscopy apparatus according to claim 1, wherein the group delay and the phase shift are each corrected using one from among: a correction method based on experimental measurement of the group delay and the phase shift that occur in the scanning light with respect to the reference light; a correction method assuming a phase shift curve and a group delay curve based on a theoretical expression; and a correction method based on machine learning optimization executed such that the phase shift curve and the group delay curve match a spectrum shape.

4. The Fourier-transform spectroscopy apparatus according to claim 1, wherein, in a calibration step, the group delay and the phase shift are acquired using a single different frequency, and wherein the scanning mirror is structured such that a rotational axis thereof can be shifted.

5. The Fourier-transform spectroscopy apparatus according to claim 1, wherein, in a calibration step, the group delay and the phase shift are acquired using CW light having a single frequency, and wherein the second arm is structured such that an irradiation position of the CW light can be shifted with respect to the scanning mirror.

6. The Fourier-transform spectroscopy apparatus according to claim 1, wherein the second arm comprises a dispersive optical element arranged on a light path of the scanning light defined between the beam splitter and the scanning mirror, and structured to diffract the scanning light, wherein the second arm applies a light path length difference to light of each wavelength component of the scanning light according to a rotational angle of the scanning mirror from an initial position thereof, such that a phase state of the light is changed for each wavelength component of the scanning light, so as to delay or advance the scanning light with respect to the reference light.

7. The Fourier-transform spectroscopy apparatus according to claim 6, wherein the scanning mirror comprises:
   at least one from among a movable scanner including a polygon scanner, a resonant scanner, a galvanometric scanner, and a MEMS scanner; or
   at least one from among a stationary scanner including an electro-optical crystal scanner and an acousto-optical scanner.

8. The Fourier-transform spectroscopy apparatus according to claim 1, wherein the detection target light is emitted from the detection target as transmission light, reflected light, or scattered light.

9. A spectroscopy method to be performed in a Fourier-transform spectroscopy apparatus comprising an interferometer comprising a beam splitter structured to split light emitted from a light source into reference light and scanning light, a first arm structured to reflect the reference light by a first mirror such that it is re-input to the beam splitter, and a second arm structured to reflect the scanning light by a second mirror such that it is re-input to the beam splitter, wherein the interferometer is structured to combine the reference light and the scanning light re-input to the beam splitter so as to generate an interference wave; and
   a spectroscopic spectrum generating unit structured to generate an interferogram based on an intensity of detection light obtained from a detection target after either light emitted from the light source or the interference wave thus combined is irradiated to the detection target, and to apply a Fourier transform to the interferogram,
   wherein the second arm is configured such that a scanning mirror is arranged on a light path of the scanning light between the beam splitter and the second mirror so as to delay or advance the scanning light with respect to the reference light according to a rotational angle of the scanning mirror,
   and wherein the spectroscopic spectrum generating unit corrects a group delay which is a delay between an envelope of the reference light and an envelope of the scanning light and a phase shift with respect to a carrier wave included in each envelope, such that the group and the phase are aligned at regular intervals.

* * * * *